(12) United States Patent
Kandula et al.

(10) Patent No.: US 12,072,700 B2
(45) Date of Patent: Aug. 27, 2024

(54) RETROFIT REMOTE CONTROL SYSTEM FOR A MACHINE

(71) Applicant: Caterpillar Inc., Peoria, IL (US)

(72) Inventors: Suneel Venkata Kandula, Hyderabad (IN); Ashish Abraham Varghese, Essendon (AU); Sai Praveen Gundlapalli, Chennai (IN); Anthony Keith Nathan Nelson, Fourth (AU); Martin Victor Pilgrim, Havenview (AU)

(73) Assignee: Caterpillar Inc., Peoria, IL (US)

( * ) Notice: Subject to any disclaimer, the term of this patent is extended or adjusted under 35 U.S.C. 154(b) by 333 days.

(21) Appl. No.: 17/370,784

(22) Filed: Jul. 8, 2021

(65) Prior Publication Data
US 2022/0026899 A1  Jan. 27, 2022

(30) Foreign Application Priority Data
Jul. 24, 2020  (IN) .............................. 202011031868

(51) Int. Cl.
*G05D 1/00* (2024.01)
*B60R 16/023* (2006.01)
(Continued)

(52) U.S. Cl.
CPC ....... *G05D 1/0016* (2013.01); *B60R 16/0231* (2013.01); *B60W 10/06* (2013.01);
(Continued)

(58) Field of Classification Search
CPC .............. G05D 1/0016; G05D 1/0033; G05D 2201/0202; G05D 2201/021;
(Continued)

(56) References Cited

U.S. PATENT DOCUMENTS 6,633,800 B1  10/2003  Ward et al.
8,515,626 B2  8/2013  Chiocco
(Continued)

FOREIGN PATENT DOCUMENTS

EP   2739792     6/2014
WO   2012122463  9/2012
(Continued)

*Primary Examiner* — Anne Marie Antonucci
*Assistant Examiner* — Lidia Kwiatkowska

(57) ABSTRACT

A retrofittable remote control system is provided for enabling remote controlling of an on-board component of machine that is inherently incapable of being remote controlled. An interface control module is retrofitted on machine and is configured to communicate with off-board remote control over wireless communication channel. The interface control module detects presence of an on-board control module that communicates with the on-board component over a digital communication channel. The interface control module is configured to then establish either a digital communication link with the on-board control module or a direct Input/Output (I/O) communication link with the on-board component of the machine based on the detection. The interface control module is configured to send a control signal over either the direct I/O communication link or the digital communication channel via the detected on-board control module, for controlling the on-board component.

17 Claims, 9 Drawing Sheets

(51) Int. Cl.
*B60W 10/06* (2006.01)
*B60W 10/10* (2012.01)
*B60W 10/18* (2012.01)
*B60W 10/20* (2006.01)
*B60W 10/30* (2006.01)
*B60W 60/00* (2020.01)

(52) U.S. Cl.
CPC ............ *B60W 10/10* (2013.01); *B60W 10/18* (2013.01); *B60W 10/20* (2013.01); *B60W 10/30* (2013.01); *B60W 60/00* (2020.02); *G05D 1/0033* (2013.01)

(58) Field of Classification Search
CPC . G05D 1/0022; B60R 16/0231; B60W 10/06; B60W 10/10; B60W 10/18; B60W 10/20; B60W 10/30; B60W 60/00; E02F 9/205; G08C 2201/93; G08C 17/02
See application file for complete search history.

(56) References Cited

U.S. PATENT DOCUMENTS

| | | | |
|---|---|---|---|
| 9,110,468 | B2 | 8/2015 | Funke et al. |
| 9,164,508 | B1* | 10/2015 | Takach, Jr. ............. G05D 1/021 |
| 9,418,542 | B2 | 8/2016 | Beckmann |
| 9,786,105 | B2* | 10/2017 | Moloney ................ G07C 5/008 |
| 9,910,434 | B1* | 3/2018 | Nelson .................. H04L 67/125 |
| 10,114,370 | B2 | 10/2018 | Nelson et al. |
| 2018/0143625 | A1* | 5/2018 | Nelson .................... E02F 9/205 |
| 2019/0284027 | A1 | 9/2019 | Albrecht |
| 2019/0331761 | A1 | 10/2019 | Wynn et al. |

FOREIGN PATENT DOCUMENTS

| | | |
|---|---|---|
| WO | 2015144028 | 10/2015 |
| WO | 2015195026 | 12/2015 |

* cited by examiner

RETROFIT REMOTE CONTROL SYSTEM FOR A MACHINE

TECHNICAL FIELD

The present disclosure generally relates to systems and methods for remote controlling of a machine. More particularly, the present disclosure relates to a retrofittable remote control system for a machine that is inherently incapable of being remotely controlled.

BACKGROUND

Many machines used in construction, earth-moving, mining and agriculture industries operate in challenging environments. For example, mining trucks operate in underground mines, where the operating conditions may be difficult and many a times, not suitable for manual operations. In recent efforts to improve safety, many companies are developing machines with remote operation capabilities so that an operator can operate the machine from a remote and safe location.

Additionally, there are numerous remote control kits available in the market, that can be retrofitted onto a machine to facilitate remote operations of that particular machine. Nevertheless, due to different electrical, electronic, and other control systems used in different types of machines, these remote control kits are typically specific to each of these different types of machines. Moreover, these remote control kits require a certain level of basic communication capabilities within the machine, for facilitating remote controlling of the machine and its components. However, all such conventional remote control kits are very complex and expensive, and hence not very desirable.

U.S. Pat. No. 9,418,542 (hereinafter referred to as the '542 patent) provides a method for operating a remote control system. The method includes the steps of providing a remote control system with an operating unit having a display and at least one operating element and with a communication unit having a communication connection to the operating unit; providing a control unit, which has a communication connection to the communication unit, of a work machine; detecting an operating unit's actual configuration with a plurality of operating and selection menus by using the operating unit; transmitting the operating unit's actual configuration from the operating unit to the control unit; detecting a work machine's actual configuration by using the control unit; selecting at least one of the operating and selection menus depending on the work machine's actual configuration; transmitting at least one operating and selection menu to the operating unit; and displaying at least one operating and selection menu on the display.

SUMMARY OF THE INVENTION

In an aspect of the present disclosure, a retrofittable remote control system is provided for enabling remote controlling of an on-board component of a machine that is inherently incapable of being remote controlled. The retrofittable remote control system includes an interface control module and an off-board remote control configured to communicate with the interface control module over a wireless communication channel. The interface control module is configured to be retrofitted on the machine and is configured to detect presence of an on-board control module associated with the on-board component of the machine. The on-board control module is configured to communicate with the on-board component over a digital communication channel disposed on the machine. The interface control module is configured to establish a digital communication link with the on-board control module over the digital communication channel when the on-board control module is detected to be present on the machine and establish a direct Input/Output (I/O) communication link with the on-board component of the machine when the on-board control module is detected to be absent from the machine. The interface control module is configured to receive a remote operation command from the off-board remote control to control the on-board component of the machine. Further, the interface control module is configured to send, based on the detection, a control signal over one of the direct I/O communication link or the digital communication channel via the detected on-board control module, for controlling the on-board component of the machine, the control signal being corresponding to the wirelessly received remote operation command.

In another aspect of the present disclosure, a method for enabling remote controlling of an on-board component of a machine that is inherently incapable of being remote controlled. The method includes retrofitting an interface control module on to the machine, the interface control module being configured to communicate with an off-board remote control over a wireless communication channel. Further, the method includes detecting, by the retrofitted interface control module, presence of an on-board control module associated with the on-board component of the machine, the on-board control module being configured to communicate with the on-board component over a digital communication channel. The method includes establishing, by the interface control module, a digital communication link with the on-board control module over the digital communication channel when the on-board control module is detected to be present on the machine and establishing, by the interface control module, a direct Input/Output (I/O) communication link with the on-board component when the on-board control module is detected to be absent from the machine. Furthermore, the method includes wirelessly receiving, by the interface control module, a remote operation command from the off-board remote control over the wireless communication channel to control the on-board component of the machine. The method includes sending, by the interface control module, based on the detection, a control signal over one of the direct I/O communication link or the digital communication link via the detected on-board control module, for controlling the on-board component, the control signal being corresponding to the wirelessly received remote operation command.

In a yet another embodiment, a machine is provided. The machine includes an on-board component inherently incapable of being remotely controlled. The machine further includes a retrofit remote control system operatively connected to the on-board component and configured to enable remote controlling of the on-board component. The retrofit remote control system includes an interface control module and an off-board remote control configured to communicate with the interface control module over a wireless communication channel. The interface control module is configured to be retrofitted on the machine and is configured to detect presence of an on-board control module associated with the on-board component of the machine. The on-board control module is configured to communicate with the on-board component over a digital communication channel disposed on the machine. The interface control module is configured to establish a digital communication link with the on-board control module over the digital communication channel when the on-board control module is detected to be present on the machine and establish a direct Input/Output (I/O) communication link with the on-board component of the machine when the on-board control module is detected to be absent from the machine. The interface control module is configured to receive a remote operation command from the off-board remote control to control the on-board component of the machine. Further, the interface control module is configured to send, based on the detection, a control signal over one of the direct I/O communication link or the digital communication channel via the detected on-board control module, for controlling the on-board component of the machine, the control signal being corresponding to the wirelessly received remote operation command.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
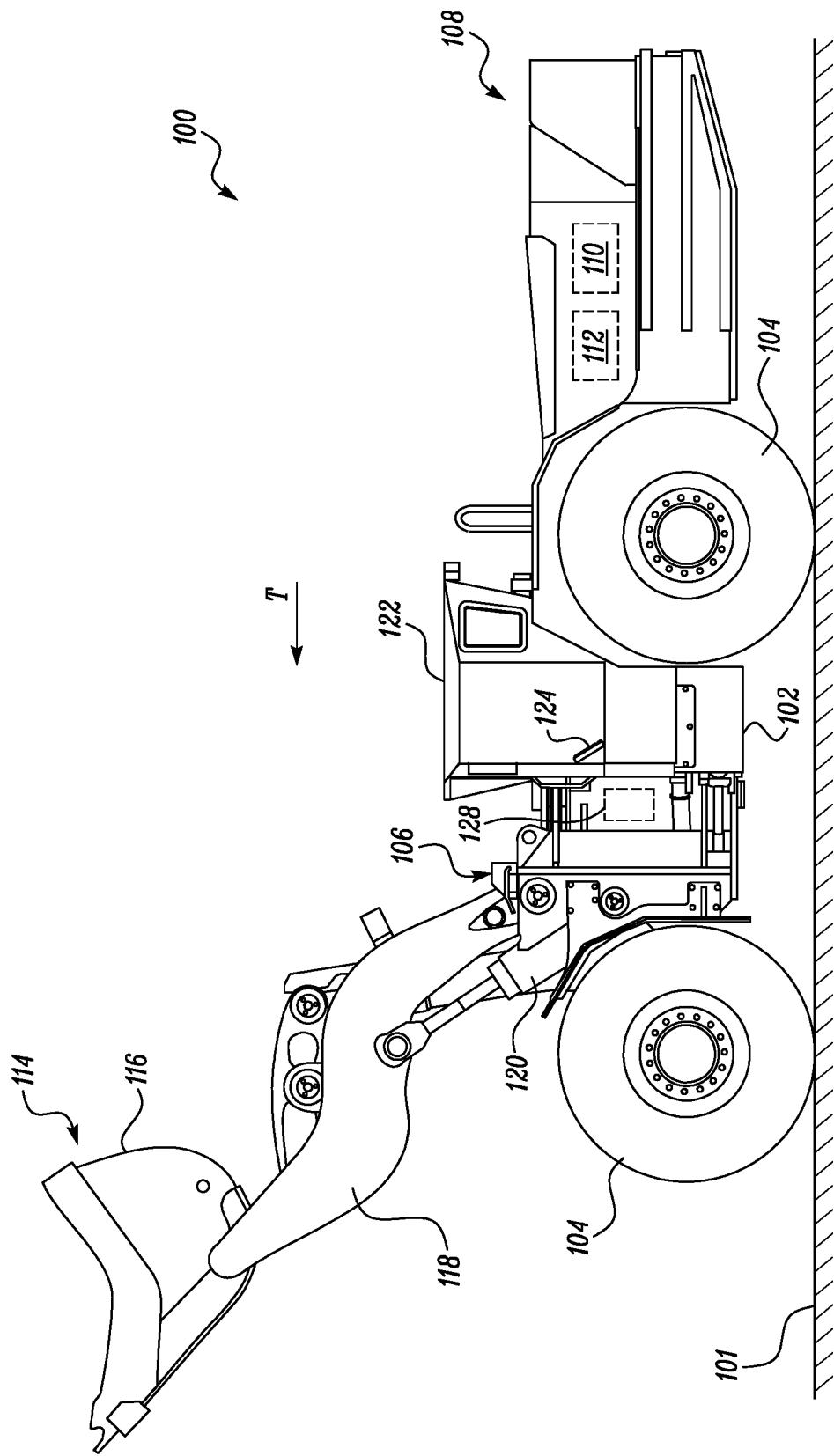
FIG. 1 illustrates an exemplary machine operating on a worksite, in accordance with the embodiments of the present disclosure.

The present disclosure relates to a retrofittable remote control system for enabling remote control of a machine that is inherently incapable of being remote controlled. To this end, FIG. 1 illustrates an exemplary machine 100 configured to operate at a worksite 101. The worksite 101 may include a mine site, a land fill, a quarry, a construction site, or any other type of worksite. As shown in FIG. 1, the machine 100 is embodied as an underground mining machine, such as an underground a load haul dump (LHD) machine. However, it may be contemplated that machine 100 may be any type of machine configured to perform some type of operation associated with an industry such as mining, construction, farming, transportation, or any other industry. Other examples of machine 100 may include, but are not limited to, an off-highway truck, an articulated truck, a paver screed, an excavator, a backhoe loader, a skid steer loader, a wheel loader, a compactor, or the like. In an embodiment of the present disclosure, the machine 100 is a manned machine which is incapable of being remote controlled by itself.

As shown in FIG. 1, the machine 100 includes a machine frame 102 with a set of ground engaging members 104, such as wheels or tracks, coupled with the frame 102. The frame 102 defines a front end 106 and a rear end 108. The terms 'front' and 'rear', as used herein, are in relation to a direction of travel of the machine 100, as represented by arrow, T, in FIG. 1, with said direction of travel being exemplarily defined from the rear end 108 towards the front end 106. The movement of the ground engaging members 104 may be powered by a power source, such as an engine 110 via a transmission 112 and/or mechanical and electrical drive train (not shown). In the illustrated example, the engine 110 may be housed within an engine compartment (not shown) positioned towards the rear end 108 of the machine 100. Further, the engine 110 may be based on one of the commonly applied power generation units, such as an internal combustion engine (ICE) having a V-type configuration, inline configuration, or an engine with different configurations, as are conventionally known. However, aspects of the present disclosure need not be limited to a particular type of power source. Although the power source is shown and described to be an engine, it may be contemplated that power source may also be embodied as a battery, a fuel cell, electric generator, a turbine or any other suitable device configured to power the machine 100. Additionally, in some alternative implementations, the machine 100 may include multiple power sources positioned at the front end 106 and at the rear end 108 of the machine 100.

The machine 100 further includes an implement 114, such as a bucket 116. The machine 100 may also include a pair of lift arms 118 that are movably coupled to the frame 102 at the front end 106. The implement 114 is pivotally connected to one end of the lift arms 118 by any suitable coupling mechanism, such as coupler, pin, latches, or any other mechanism generally known in the art. The machine 100 further includes one or more lift cylinders 120 that couple the lift arms 118 to the frame 102. The lift cylinders 120 are extended or retracted to raise or lower the lift arms 118. Although the implement 114 is shown and described to be a bucket 116, it may be contemplated that in other embodiments of the present disclosure, other types of implements, such as, but not limited to, dump body, ejector body, blades, scrapers, grapples, or the like may also be employed by the machine 100. Additionally, the position of the implement 114 being at the front end 106 of the machine 100 is exemplary and other positions of the implement may also be contemplated without limiting the scope of the claimed subject matter.

The machine 100 further includes an operator cab 122 that may be supported on the frame 102. The operator cab 122 includes an operator seat (not shown) and an operator console 124, that may include various input output controls for operating the machine 100. For example, the operator console 124 may include, but not limited to, one or more of steering wheel, touch screens, joysticks, switches etc., to facilitate an operator in operating the machine 100 and one or more components of the machine 100.

Figure 2:
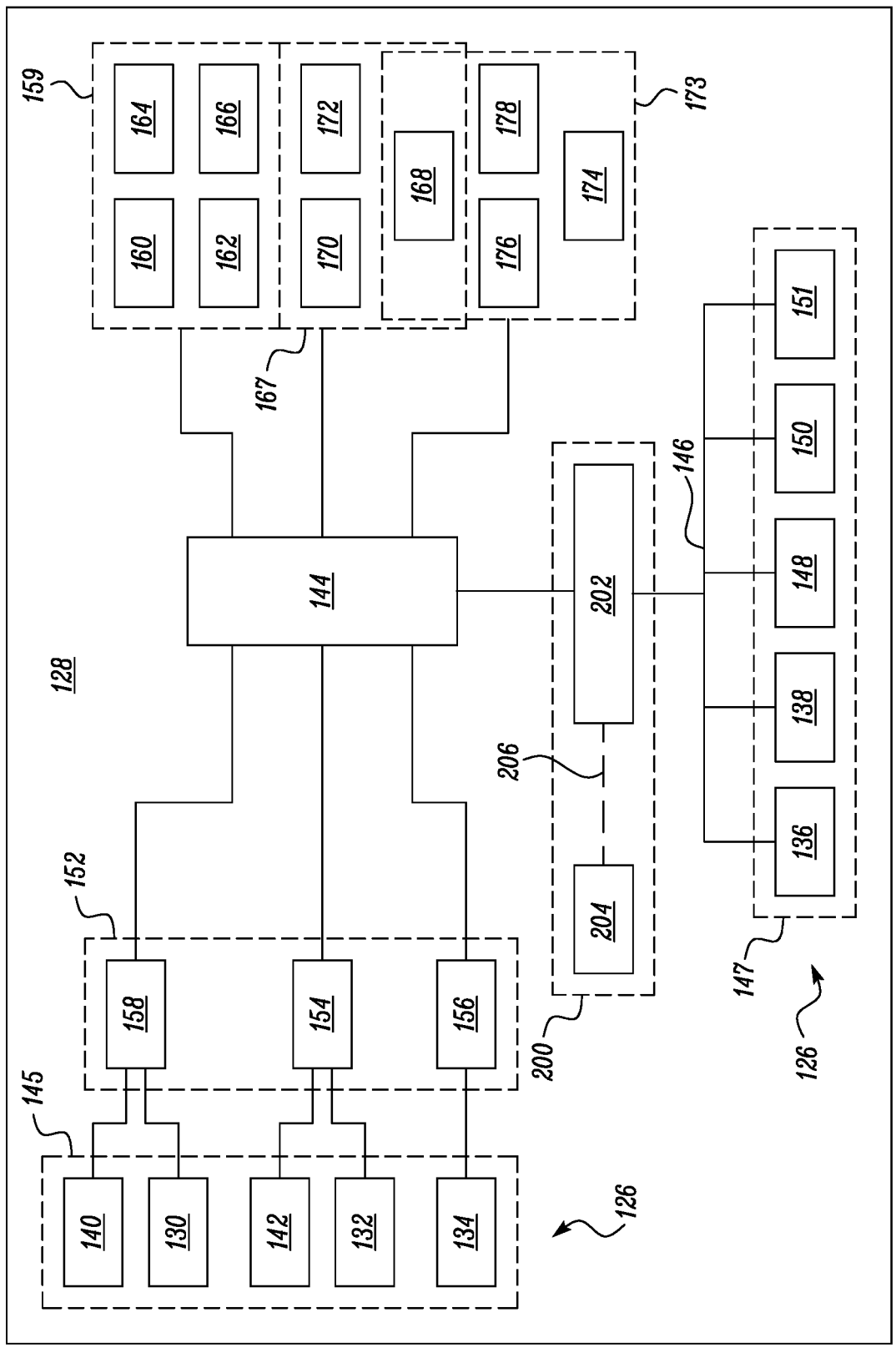
FIG. 2 illustrates an exemplary control system of the machine having a retrofit remote control system, in accordance with the embodiments of the present disclosure.

In an embodiment of the present disclosure, as shown in FIGS. 1 & 2, the machine 100 includes a plurality of on-board components 126 and a control system 128 for controlling the on-board components 126 and operating the machine 100. Examples of the on-board components 126 may include, but not limited to, engine controls 130, machine controls 132, transmission controls 134, implement controls 136, work light controls 138, engine cooling system controls 140, tire monitoring system controls 142, horn assembly controls 148, cab door actuation mechanism controls 150, indicator system controls 151, and so on.

The engine controls 130 may include one or more engine 110 related controls and actuators, such as engine throttle, starter solenoid, intake and exhaust valves, fuel injector/spark plug timers, engine crankshaft, piston, timing belt, and so on, that facilitate operations of the engine 110 of the machine 100. In an alternative embodiment, in case of a battery operated machine, the machine 100 may include battery controls (not shown) that facilitate operations of the battery system (not shown) of the machine 100. Machine controls 132 may include one or more machine related controls, such as traction controls, brakes controls, in-cab controls (including steering controls, joystick controls, etc.) and input/output devices (such as those in operator console 124), and so on that facilitate in operations of the machine 100. Further, the transmission controls 134 may include all the components and actuators in the transmission 112 of the machine 100. Example of transmission controls 134 may include, but not limited to, transmission solenoids, torque converter clutch solenoid, pressure control solenoids, and so on. The implement controls 136 may include controls and actuators for controlling the implement 114. Examples of the implement control 136 may include, but not limited to, the lift cylinders 120, the implement solenoids, hoist controls, and so on. It may be contemplated that the implement controls 136 of the machine 100 will vary according to the machine type. The work light controls 138 includes the controls and switches for operating the work lights, such as the head light, fog-lights, break lights, and so on.

Furthermore, the engine cooling system controls 140 includes controls and actuators for operating the various components of an engine cooling system of the machine 100. For example, the engine cooling system controls 140 may include, but not limited to, controls for radiator, cooling fan, thermostat, radiator cap, and so on. The tire monitoring system controls 142 may include components and actuators for monitoring air pressure inside the ground engaging members 104 of the machine 100 and provide the monitored information to an operator of the machine 100 via input/output devices included in the operator console 124 of the machine 100. Similarly, the horn assembly controls 148 may include the actuators and switches for activating horn during operation of the machine 100. The cab door actuation mechanism controls 150 may include actuators and switches for operating a cab door of the operator cab 122 of the machine 100. Furthermore, the indicator system controls 151 may include actuators and switches for activating turning indicators (including left and right turn indicators disposed on the front and rear of the machine 100) and/or parking brake indicators, etc., as the machine operates at the worksite 101.

It may be contemplated by a person skilled in the art, that the above mentioned list of on-board components 126 are merely exemplary and does not represent a comprehensive list of all the on-board components and the machine 100 may include additional components as well. The list of on-board components 126 is merely for explanation purposes and is in no way intended to be limiting the scope of the claimed subject matter. Further, details and operations of these on-board components 126 are known in the art and hence not included herein for the sake of brevity of the present disclosure.

The control system 128 of the machine 100 includes one or more digital communication channel 144 for facilitating communication of information related to operating the machine 100. Examples of the digital communication channel 144 may include, but not limited to, one or more of Control Area Network (CAN) bus, datalink communication channel, Ethernet cables, and any other known wired digital communication channel. It may be contemplated that the digital communication channel 144 may include one or more of coaxial cables, copper wires, fiber optics, and so on.

In an embodiment of the present disclosure, some of the on-board components 126 may include electrohydraulic controls and are capable of digitally communicating and being controlled, while the other on-board components may only be capable of being controlled via direct Input/Output (I/O) control links 146. For the purposes of explanation of this disclosure, the on-board components 126 are divided into two sub-sets, i) datalink control components 145; and ii) I/O control components 147. The datalink control components 145 are the components that are connected to the digital communication channel 144 for receiving control commands while the I/O control components 147 are the ones that are not connected to the digital communication channel 144 and instead receive control commands via their respective I/O control links 146.

In the illustrated exemplary embodiment, the engine controls 130, the transmission controls 134, the machine controls 132, the engine cooling system controls 140 and the tire monitoring system controls 142 are shown to be datalink control components 145 that are connected to the digital communication channel 144 for receiving control commands. On the other hand, the implement controls 136, the work light controls 138, and other accessories, such as horn assembly controls 148, cab-door actuation mechanism controls 150, indicator system controls 151 may be I/O control components 147 that receive control commands via their direct I/O control links 146 disposed on the machine 100. It may be understood by a person skilled in the art that the direct I/O control links 146 may be implemented as direct one-on-one mechanical and/or hydraulic connections implemented via wires, relays and switches to connect each of the on-board I/O control components 147 with their respective actuators or switches that may be, in turn, operated by an operator of the machine 100.

Further, the control system 128 of the machine 100 may include one or more on-board control modules 152 disposed on the machine 100 and configured to communicate with and control each of the datalink control components 145 of the machine 100 via the digital communication channel 144. In an exemplary embodiment of the present disclosure, the on-board control modules 152 may include, but not limited to, a machine Electronic Control Module (ECM) 154, a transmission ECM 156, and an engine ECM 158.

The machine ECM 154 may be configured to, based on input commands and signals, operatively communicate with and control the on-board machine controls 132 via the digital communication channel 144. For example, the machine ECM 154 is configured to send output control signals over the digital communication channel 144, in response to one or more input signals, to control the traction controls, brakes, in-cab controls (including steering controls, joystick controls, etc.), input/output devices (such as those in operator console 124), and so on, that facilitate in operations of the machine 100. Further, the machine ECM 154 is also configured to communicate with and control the tire monitoring system controls 142 for monitoring the air pressure within the ground engaging members 104 of the machine 100. Additionally, in some embodiments, the machine ECM 154 may also be configured to communicate with the transmission ECM 156 and the engine ECM 158 for controlling the transmission controls 134, the engine controls 130, as well as the engine cooling system controls 140.

The control system 128 may include one or more machine sensors 159 disposed on the machine 100 and configured to monitor one or more machine parameters associated with the machine controls 132. The one or more machine sensors 159 are also communicatively coupled to the digital communication channel 144 and may be configured to provide input signal including the respective monitored machine parameter to the machine ECM 154 for controlling the one or more of the machine controls 132 and/or the tire monitoring system controls 142. Examples of the machine sensors 159 may include, but not limited to, temperature sensor 160, fuel sensor 162, accelerometer 164, tire pressure sensors 166, and so on. These machine sensors 159 are all known in the art and hence not described in greater detail for the sake of brevity of the present disclosure.

The transmission ECM 156 may be configured to, based on input commands and signals, operatively communicate with and control the on-board transmission controls 134 via the digital communication channel 144. For example, the transmission ECM 156 may be configured to send control commands over the digital communication channel 144, based on one or more inputs, to control the transmission controls 134. Examples of the transmission controls 134 include, but not limited to, transmission solenoids, torque converter clutch solenoid, pressure control solenoids, and so on, disposed on the machine 100.

The control system 128 further includes one or more transmission sensors 167 disposed on the machine 100 and configured to monitor one or more transmission related parameters associated with the transmission controls 134. The one or more transmission sensors 167 are also communicatively coupled to the digital communication channel 144 and may be configured to provide input signal including the respective monitored transmission related parameter to the transmission ECM 156 for controlling transmission 112 of the machine 100. Examples of the transmission sensors 167 may include, but not limited to, a throttle position sensor 168, vehicle speed sensor 170, transmission fluid temperature sensor 172, and so on. These transmission sensors 167 are also known in the art and hence not described in greater detail for the sake of brevity of the present disclosure.

Furthermore, the engine ECM 158 may be configured to, based on input commands and signals, operatively communicate with and control the on-board engine controls 130 via the digital communication channel 144. Additionally, the engine ECM 158 may also be configured to communicate with and control the engine cooling system controls 140 via the digital communication channel 144. For example, the engine ECM 158 may be configured to send control commands over the digital communication channel 144, based on one or more inputs, to the engine throttle, starter solenoid, intake and exhaust valves, fuel injector/spark plug timers, engine crankshaft, piston, timing belt, and so on, that facilitate operations of the engine 110. Similarly, the engine ECM 158 may be configured to send control commands over the digital communication channel 144, based on one or more inputs, to the radiator, cooling fan, thermostat, radiator cap, etc., that facilitate in operating the engine cooling system controls 140 of the machine 100. It may be contemplated that in case of a battery operated machine, a battery control module (not shown) may also be implemented to control the battery controls via the digital communication channel 144.

The control system 128 further includes one or more engine sensors 173 disposed on the machine 100 and configured to monitor one or more engine related parameters associated with the engine 110, the engine controls 130, and the engine cooling system controls 140. The one or more engine sensors 173 are also communicatively coupled to the digital communication channel 144 and may be configured to provide input signal including the respective monitored engine related parameter to the engine ECM 158 for controlling the engine 110 of the machine 100. Examples of the engine sensors 173 may include, but not limited to, the throttle position sensor 168, engine speed sensor 174, cam shaft position sensor 176, engine coolant temperature sensor 178, and so on. These engine sensors 173 are also known in the art and hence not described in greater detail for the sake of brevity of the present disclosure.

Figure 6:
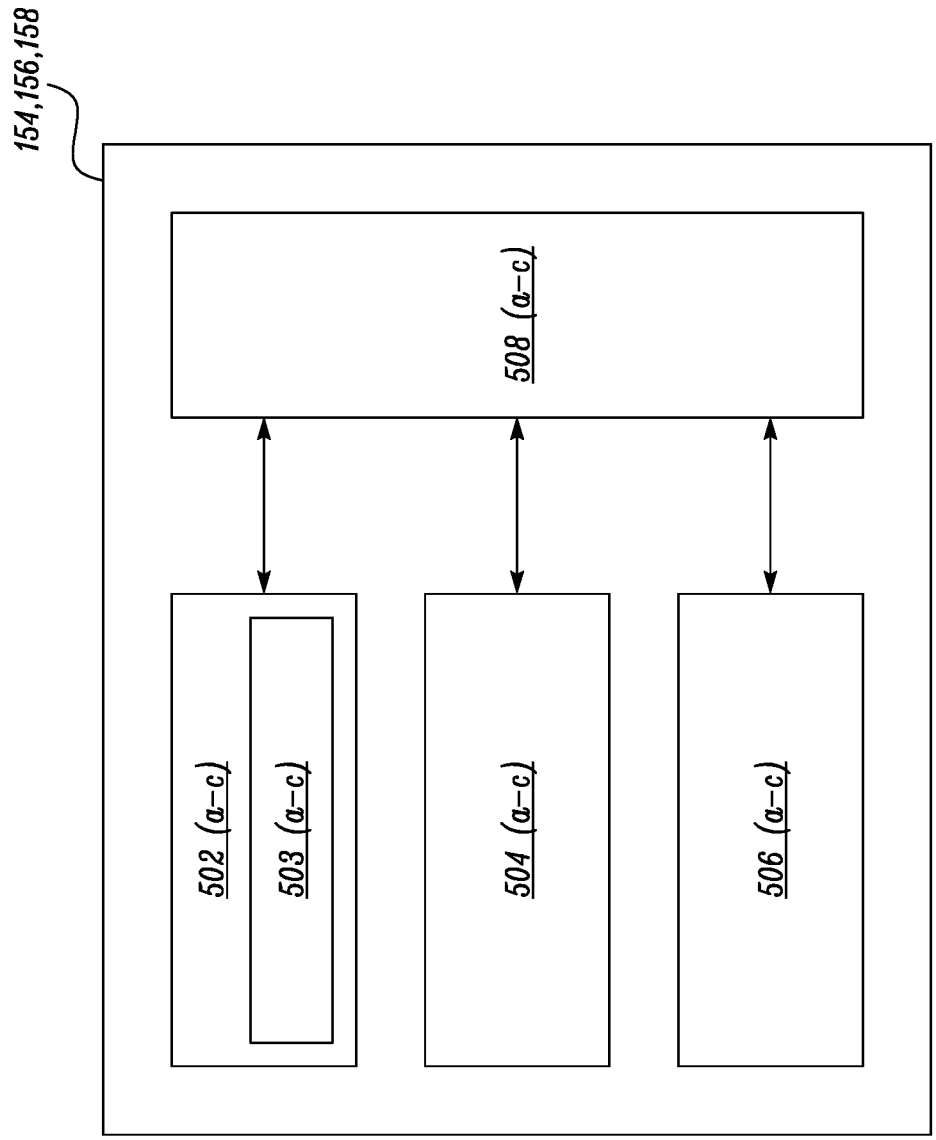
FIG. 6 illustrates an exemplary block diagram of an on-board control module of the machine, in accordance with the embodiments of the present disclosure.

Each of the on-board control modules 152, i.e., the machine ECM 154, the transmission ECM 156 and the engine ECM 158, include a respective processor 502 (i.e., 502a, 502b, 502c, respectively) having a local memory 503 (i.e., 503a, 503b, 503c, respectively). The processor 502 is in communication with a read-only memory 504 (i.e., 504a, 504b, 504c, respectively), and a random access memory 506 (i.e., 506a, 506b, 506c, respectively) via a bus 508 (i.e., 508a, 508b, 508c, respectively), as shown in FIG. 6. The processor 502 may include one or more microprocessors, microcomputers, microcontrollers, programmable logic controller, DSPs (digital signal processors), central processing units, state machines, logic circuitry, or any other device or devices that process/manipulate information or signals based on operational or programming instructions. The processor 502 may be implemented using one or more controller technologies, such as Application Specific Integrated Circuit (ASIC), Reduced Instruction Set Computing (RISC) technology, Complex Instruction Set Computing (CISC) technology, etc.

The random access memory 506 may be implemented by Synchronous Dynamic Random Access Memory (SDRAM), Dynamic Random Access Memory (DRAM), and/or any other type of random access memory device. The read-only memory 504 may be implemented by a hard drive, flash memory and/or any other desired type of memory device. The processor 502 is configured to execute machine-readable instructions and to generate (output) control signals, based on received (input) control signals from the one or more sensors and input commands from operator. Such machine-readable instructions may be read into or incorporated into a machine-readable medium such as, for example, the local memory 503.

Although the on-board control modules 152 are shown and described to include three ECMs, i.e., the machine ECM 154, the transmission ECM 156 and the engine ECM 158, it will be contemplated by a person skilled in the art that the machine 100 may include other additional on-board control modules or may include lesser number of on-board control modules based on the individual machine configuration as per the different implementations of the present disclosure. For example, newer models of machines may include a larger number of on-board control modules, such as, but not limited to, an implement ECM, an exhaust after treatment ECM, a Heating, Ventilation and Air Conditioning (HVAC) ECM, a display ECM, and so on for controlling implement controls, exhaust after treatment system controls, HVAC controls, display controls, respectively. These other on-board control modules will also communicate with and control their respective sensors and on-board components via the digital communication channel 144 in a similar manner. In an alternative embodiment of the present disclosure, the older models of the machines may have lesser number of on-board control modules. For instance, the engine controls of such older machines may be controlled by direct I/O control links by operator operated switches and actuators instead of being controlled by an engine ECM.

Further, as explained previously, the machine 100 is a manned machine that is inherently incapable of being remote controlled or wireless communication in any manner. That means, the various on-board components 126, including the datalink control components 145 as well as the I/O control components 147 are inherently incapable of being remote controlled.

In an embodiment of the present disclosure, a retrofit remote control system 200 is provided for enabling remote controlling of the machine 100 and its various on-board components 126. The retrofit remote control system 200 includes an interface control module 202 that is retrofitted on to the machine 100 and is configured to operatively connect to the various on-board components 126 (including both the datalink control components 145 as well as the I/O control components 147), the machine sensors 159 and the on-board control modules 152 of the machine 100. The retrofit remote control system 200 further includes an off-board remote control 204 configured to wirelessly communicate with the interface control module 202 over a wireless communication channel 206, thereby facilitating remote controlling of the machine 100 and its components. The detailed working of the retrofit remote control system 200 will now be described in the following description.

Figure 3:
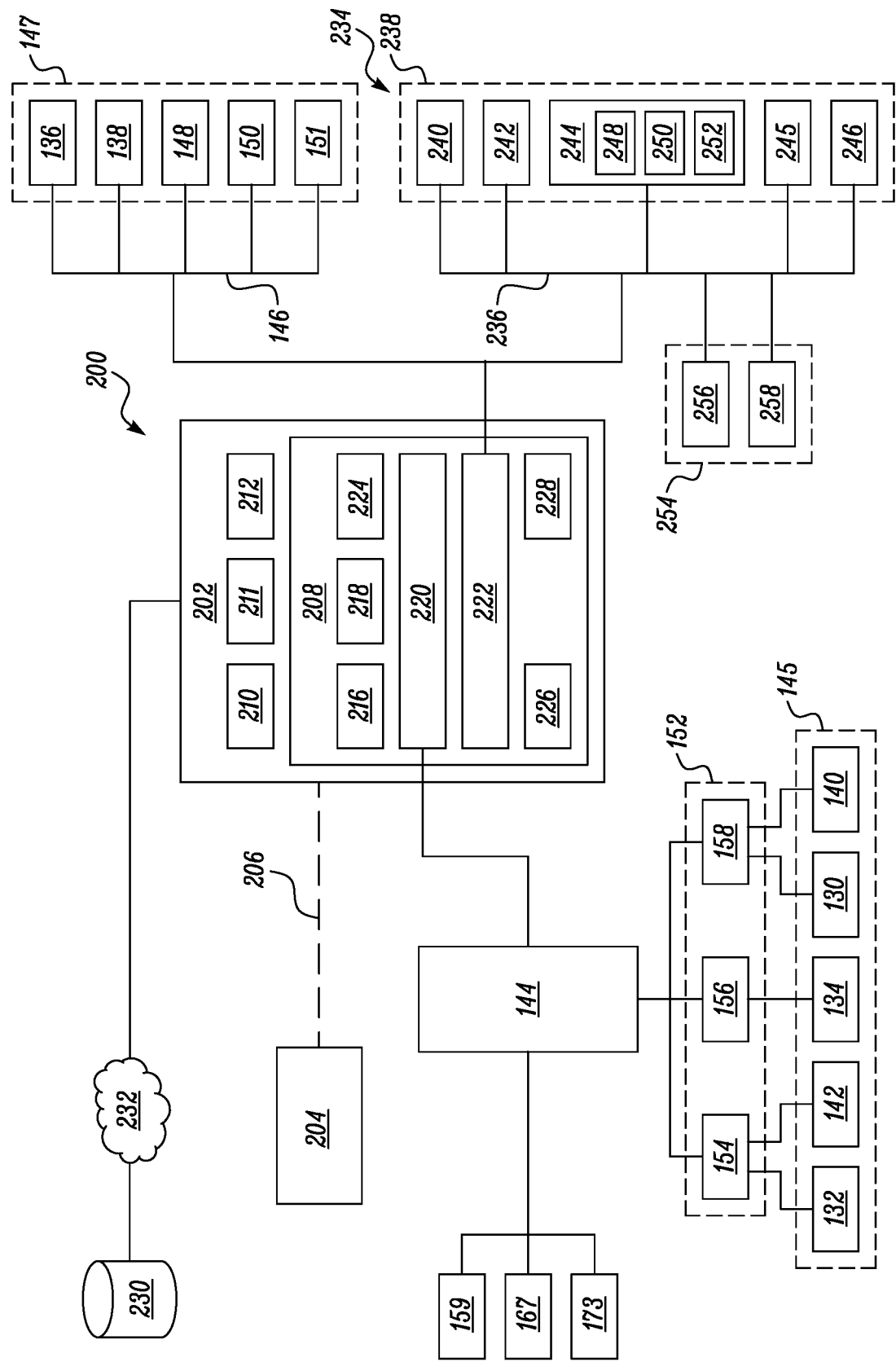
FIG. 3 illustrates an exemplary retrofit remote control system having an interface control module retrofitted to the machine, in accordance with the embodiments of the present disclosure.
Figure 4:
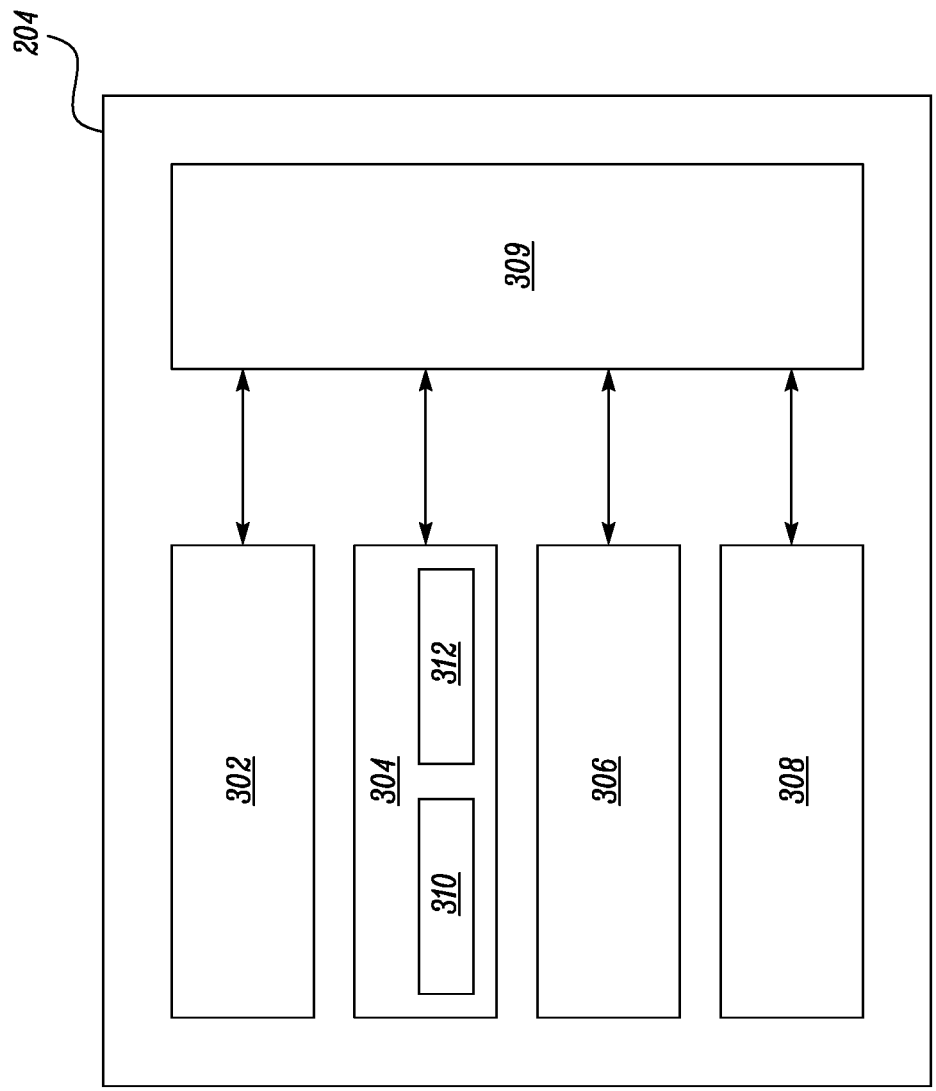
FIG. 4 illustrates an exemplary off-board remote control of the retrofit remote control system, in accordance with the embodiments of the present disclosure.
Figure 5:
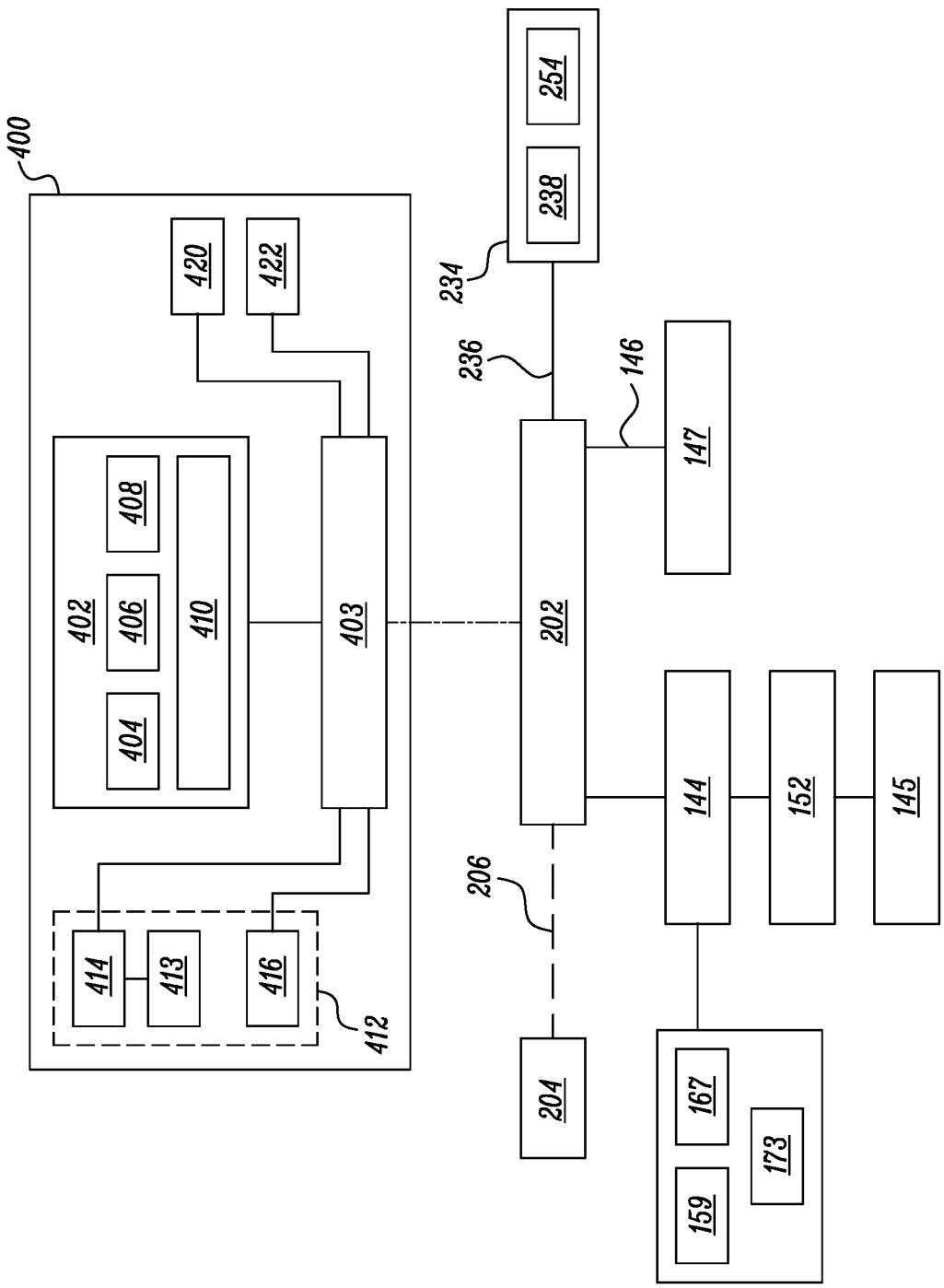
FIG. 5 illustrates an exemplary machine automation system (MAS) having an autonomy electronic control module (AECM) retrofitted to the machine, in accordance with the embodiments of the present disclosure.

Referring to FIGS. 3 to 5, details of the exemplary retrofit remote control system 200 are illustrated. As shown, the retrofit remote control system 200 includes the interface control module 202, and the off-board remote control 204 communicating with the interface control module 202 over the wireless communication channel 206.

In an exemplary embodiment of the present disclosure, the off-board remote control 204 is a line-of-sight (LOS) remote console, through which an operator can operate the machine 100 from a line-of-sight remote location. Alternatively, the off-board remote control 204 may be a remote operating console located at a remote operator station. In a yet another embodiment, the off-board remote control 204 may be a handheld mobile device having a graphical user interface (GUI) application installed thereon, for remote controlling of the machine 100. For instance, as shown in FIG. 4, the off-board remote control 204 may include a processor 302, an I/O unit 304, a memory unit 306 and a transceiver 308, configured to communicate with one another via a communication bus 309.

The processor 302 is configured to execute the instruction stored in the memory unit 306 to perform one or more predetermined operations. The processor 302 may include one or more microprocessors, microcomputers, microcontrollers, programmable logic controller, DSPs (digital signal processors), central processing units, state machines, logic circuitry, or any other device or devices that process/manipulate information or signals based on operational or programming instructions. The processor 302 may be implemented using one or more controller technologies, such as Application Specific Integrated Circuit (ASIC), Reduced Instruction Set Computing (RISC) technology, Complex Instruction Set Computing (CISC) technology, etc. The memory unit 306 may include a random access memory (RAM) and read only memory (ROM). The RAM may be implemented by Synchronous Dynamic Random Access Memory (SDRAM), Dynamic Random Access Memory (DRAM), and/or any other type of random access memory device. The ROM may be implemented by a hard drive, flash memory and/or any other desired type of memory device.

Further, the transceiver 308 transmits and receives messages and data to/from the interface control module 202 over the wireless communication channel 206. In various embodiments, the transceiver 308 is configured to transmit and receives data/messages in accordance with the various communication standards and protocols, such as, TCP/IP, UDP, and 2G, 3G, or 4G communication protocols. Further, the I/O unit 304 may include an input device 310 and an output device 312. The input device 310, in various embodiments, may include, but not limited to, a keyboard, a touchscreen, or any other type of input device known in the art. Similarly, the output device 312, in various embodiments, may include, but not limited to, a display device, an audio output device, a haptic output device, a touchscreen, or any other output device known in the art. The I/O unit 304 is configured to receive input signals and notifications from and send output signals (commands) to the interface control module 202 over the wireless communication channel 206 via the transceiver 308. Thus, an operator can use the off-board remote control 204 to receive input signals from the interface control module 202 about the machine 100 and its components and provide control commands for controlling the machine 100 remotely.

Referring back to FIG. 3, the wireless communication channel 206 may be any type of communication channel that can facilitate transmission of data and commands wirelessly between the off-board remote control 204 and the interface control module 202. Examples of the wireless communication channel 206 may include, but not limited to, a Frequency Hopping Spread Spectrum (FHSS) communication channel, radio broadcasting system, Wi-fi communication channel, and so on.

The interface control module 202 includes a processor 208 in communication with a memory unit 210, an I/O unit 211 and a transceiver 212. The processor 208 is configured to execute the instruction stored in the memory unit 210 to perform one or more predetermined operations. The processor 208 may include one or more microprocessors, microcomputers, microcontrollers, programmable logic controller, DSPs (digital signal processors), central processing units, state machines, logic circuitry, or any other device or devices that process/manipulate information or signals based on operational or programming instructions. The processor 208 may be implemented using one or more controller technologies, such as Application Specific Integrated Circuit (ASIC), Reduced Instruction Set Computing (RISC) technology, Complex Instruction Set Computing (CISC) technology, etc.

The memory unit 210 may include a random access memory (RAM) and read only memory (ROM). The RAM may be implemented by Synchronous Dynamic Random Access Memory (SDRAM), Dynamic Random Access Memory (DRAM), and/or any other type of random access memory device. The ROM may be implemented by a hard drive, flash memory and/or any other desired type of memory device.

The transceiver 212 transmits and receives messages and data to/from the off-board remote control 204 over the wireless communication channel 206. In various embodiments, the transceiver 212 is configured to transmit and receives data/messages in accordance with the various communication standards and protocols, such as, TCP/IP, UDP, and 2G, 3G, or 4G communication protocols. Further, the I/O unit 211 is configured to receive input commands from and send output notifications to the off-board remote control 204 over the wireless communication channel 206 via the transceiver 212.

In an exemplary embodiment of the present disclosure, the processor 208 includes a machine detection module 216, a processing module 218, a datalink connection module 220, an I/O connection module 222, a sensing module 224, an execution module 226 and a safety module 228. Each of these modules within the interface control module 202 are configured to communicate with one another via a communication bus (not shown).

Initially, the machine detection module 216 is configured to detect a machine type and machine configuration, to which the retrofit remote control system 200 is connected. Thus, the machine detection module 216 is configured to detect whether the retrofit remote control system 200 is connected to a Load Haul Dump (LHD) machine, or an underground articulated truck (UAT), a paver screed, an excavator, a backhoe loader, a skid steer loader, a wheel loader, or a compactor, etc. In an exemplary implementation, the machine detection module 216 may receive an input from the off-board remote control 204 indicating a pre-defined machine type to which the retrofit remote control system 200 is connected. Alternatively, the machine detection module 216 may provide a list of machine types to the I/O unit 304 of the off-board remote control 204 and receive a user selection of the machine type from the off-board remote control 204. In addition to the machine type, the machine detection module 216 may also receive a machine identification and/or any other information related to the machine type and machine configuration from the off-board remote control 204.

Based on the detected machine type, the processing module 218 is configured to detect the configuration of the machine 100 and its on-board components 126. For example, the processing module 218 may be configured to communicate with a machine database 230 that includes the various configuration details of all the machine types. The machine database 230 may be implemented as a part of the retrofit remote control system 200 or may be a separate database implemented on an external server, to which, the retrofit remote control system 200 may connect to via a communication network 232, such as Local Area Network (LAN), Wide Area network (WAN) or Internet. Alternatively, the machine configuration details may be received along with the machine identification from the operator via the off-board remote control 204. The machine database 230 may store the details about every machine, including the machine type, machine model number, machine make year, machine manufacturer, machine configuration details and so on. Further, the machine configuration details may include the details about the various on-board components of every type of machine, their respective control links, the one or more on-board control modules associated with each type of machine, and so on. For example, in case of a load haul dump machine (as shown in FIG. 1), the machine configuration details may indicate that the machine includes bucket as an implement, includes three ECMs, the list of datalink control components, list of I/O control components, the various sensors disposed on the machine and so on. It may be contemplated by a person skilled in the art that the machine configuration details will vary for every machine type, for different machine models, and even for different versions of the same machine type. For instance, as explained previously, an older version of the LHD machine may include fewer on-board control modules whereas a newer version of the LHD machine may include an even greater number of on-board control modules.

In an embodiment of the present disclosure, the processing module 218 is configured to detect presence of any on-board control modules on the machine 100. In an example, the processing module 218 may be configured to extract the details of the on-board control modules 152 from the machine configuration received from the machine database 230. Alternatively, the operator of the machine 100 may manually feed the details of the on-board control modules 152 present on the machine 100. Thus, in the ongoing example of the LHD machine (machine 100 shown in FIG. 1), the processing module 218 will detect presence of three on-board control modules, i.e., the machine ECM 154, the transmission ECM 156 and the engine ECM 158.

Based on the detected presence of on-board control modules 152, the processing module 218 is configured to detect the control capabilities of each of the on-board components 126 of the machine 100. In an embodiment of the present disclosure, the processing module 218 is configured to identify that the on-board components that are controlled by the on-board control modules are capable of datalink control, whereas all the other on-board components that are not controlled by any on-board control modules are capable of only direct I/O controls. Thus, in the ongoing example, the processing module 218 is configured to identify the engine controls 130, machine controls 132, the transmission controls 134, the engine cooling system controls 140 and the tire monitoring system controls 142 as being capable of being controlled via electrical signals over the digital communication channel, i.e., are datalink controls. Similarly, the processing module 218 is configured to identify the implement controls 136, the work light controls 138, horn assembly controls 148, cab door actuator mechanism controls 150 and the indicator system controls 151 as being capable of being controlled solely via their respective direct I/O control links 146.

The processing module 218 is configured to establish a digital communication link with the on-board control modules 152 for controlling the datalink control components 145 of the machine 100. In an embodiment of the present disclosure, the processor 208 includes the datalink connection module 220 configured to operatively connect with the digital communication channel 144 of the machine 100. The processing module 218 causes the datalink connection module 220 to establish the digital communication link with each of the on-board control modules 152 by connecting to the existing digital communication channel 144 present on the machine 100. Once the datalink connection module 220 establishes the digital communication link with the digital communication channel 144 of the machine 100, the processor 208 starts controlling the datalink components 145 of the on-board components 126 through the on-board control modules 152 by sending control commands over the digital communication channel 144.

In an exemplary embodiment, the processing module 218 is configured to operatively connect to the various sensors 159 on-board the machine 100. For example, the sensing module 224 within the processor 208 is configured to receive one or more machine parameters monitored by these on-board sensors 159 over the digital communication channel 144. Alternatively, the sensing module 224 may be configured to receive these machine parameters from the respective on-board control modules 152. Further, the I/O unit 211 may be configured to transmit the monitored machine parameters to the off-board remote control 204 to facilitate remote operation of the machine 100 by the remote operator based on the monitored machine parameters.

In an embodiment of the present disclosure, the processing module 218 is configured to establish the direct I/O control link 146 with each of the on-board components 126 that are capable of being controlled solely by direct I/O controls. For example, the I/O connection module 222 of the processor 208 may be configured to operatively connect individually with every I/O control component 147 of the machine 100. These components, as explained previously, are not operated by any on-board control module and instead, can only be controlled via direct I/O control links. The direct I/O control link 146 between the interface control module 202 and each of the individual components on the machine 100, may also be supplemented with appropriate wiring and harnessing disposed on the machine 100 to connect the individual component with the interface control module 202. Once the I/O connection module 222 connects to the I/O control components 147 of the machine 100, the processor 208 starts controlling these components over the respective direct I/O control links 146.

In some exemplary implementations, additional sensors (not shown) may also be retrofitted on to the machine 100 to facilitate in remote operating of these I/O control components 147 of the machine 100. For example, an articulation sensor may be retrofitted on the implement 114 to monitor articulation of the implement 114 remotely and accordingly facilitate controlling of the movement of the implement 114 remotely. In some examples, the additional sensors may be configured to operatively connect and communicate with the interface control module 202 over the digital communication channel 144 in a similar manner as described for the other on-board sensors 159 of the machine 100.

In an exemplary embodiment of the present disclosure, the retrofit remote control system 200 may further include a plurality of ad-hoc components 234 configured to be retrofitted on to the machine 100. The ad-hoc components 234 may include one or more components that are configured to support the proper functioning of the interface control module 202 and the retrofit remote control system 200. Further, the ad-hoc components 234 may also include one or more components that may be configured to provide additional enhanced functionalities to the machine 100, that were originally missing from the machine 100. These ad-hoc components 234 may also be implemented in the same manner as that of the existing I/O control components 147 disposed on the machine 100. That means, the ad-hoc components 234 may also each be connected to the interface control module 202 by direct I/O control links 236 including appropriate wiring and harnessing on the machine 100. Once the I/O connection module 222 connects to each of these ad-hoc components 234, the processor 208 starts controlling these ad-hoc components 234 over their respective direct I/O control links 236.

In an embodiment of the present disclosure, the ad-hoc components 234 may include a first set of ad-hoc components 238 that are essential to support the proper functioning of the retrofit remote control system 200. For example, the first set of ad-hoc components 238 may include, but not limited to, an enclosure cooling assembly 240, an enclosure temperature sensor 242, strobe light assembly 244 (including red, amber and green strobe lights), an Automation Control Enable (ACE) switch 245, safety expander relay assembly 246, and so on. The enclosure cooling assembly 240 and the enclosure temperature sensor 242 may be disposed within an enclosure (not shown) in which the interface control module 202 is housed and disposed on the machine 100. The enclosure temperature sensor 242 may be configured to continuously monitor the enclosure temperature and provide a notification alert to the off-board remote control 204 when the enclosure temperature exceeds a predefined safety threshold temperature. Similarly, the enclosure cooling assembly 240 may include a cooling fan disposed inside the enclosure to keep the enclosure cool and within the safety threshold temperature. Further, the strobe light assembly 244 may include three strobe lights, i.e., the red strobe light 248, the amber strobe light 250 and the green strobe light 252. Each of these strobe lights may be configured to indicate the remote operating mode of the machine 100 during remote operations. For example, the red strobe light 248 indicates that the machine 100 is armed for non-line of sight or autonomous operation, the amber strobe light 250 indicates that the machine 100 is prevented from non-line of sight, remote or autonomous operation and the green strobe light 252 indicates that the machine 100 is either ready or is being operated in the remote control mode. The ACE switch 245 may be configured to indicate the operating mode of the machine 100 to the interface control module 202. For example, the ACE switch 245 may be turned ON to indicate to the interface control module 202 that the machine 100 is operating in the automation mode, whereas the ACE switch 245 may be turned OFF to indicate to the interface control module 202, that the machine 100 is operating in a manual mode.

Further, the safety expander relay assembly 246 includes one or more expander relays that are configured to communicate with the safety module 228 to automatically shut down the machine 100 or temporarily suspend the execution of operation commands corresponding to one or more safety issues. Examples of the safety issues include, but not limited, presence of another machine in close proximity of the machine 100, issues with one or more of the engine controls, issues with engine cooling system, issues with one or more transmission controls 134, etc.

In an embodiment of the present disclosure, the ad-hoc components 234 may include a second set of ad-hoc components 254 that provide additional functionalities that were originally not supported or present on the machine 100. For example, the second set of ad-hoc components 254 may include, but not limited to, environment monitoring assembly 256, fire suppression system 258, and so on.

The environment monitoring assembly 256 may include a number of proximity sensors positioned on the periphery of the machine 100 to provide object detection in proximity of the machine 100. The environment monitoring assembly 256 may also include one or more cameras, laser detection and ranging systems (LADARs), etc., that can be retrofitted on the machine 100 to provide environment monitoring functionalities when the machine 100 is operated remotely. The fire suppression system 258 may be configured to include sensors, controls and actuators for suppressing any fire that may occur on the machine 100, during remote operations.

Once the communication connections are established, as explained above, with all the on-board components 126, the on-board control modules 152, the ad-hoc components 234, and the machine sensors 159, the interface control module 202 starts controlling all these machine components in response to input/output operation commands wirelessly received from the off-board remote control 204 over the wireless communication channel 206. As explained previously, the I/O unit 211 receives the input operation commands from the off-board remote control 204 over the wireless communication channel 206 via the transceiver 212.

The processor 208 of the interface control module 202 further includes the execution module 226 configured to execute the operation commands received from the off-board remote control 204. The processing module 218 may be configured to identify the relevant component of the machine 100 to which the input operation command is associated with and accordingly the execution module 226 sends the control signal over either the digital communication channel 144 or the direct I/O control link 146 or 236. This means, the processing module 218 detects whether the desired component can be controlled via an on-board control module or not and accordingly sends the control signal over one of the digital communication channel 144 (if the component can be controlled by an on-board control module) or the direct I/O control link 146 or 236 (if the component cannot be controlled via an on-board control module). For example, if the wirelessly received input operation command indicates changing the position of the implement 114, then the execution module 226 may coordinate with the I/O connection module 222 to send the control signal over the direct I/O communication link associated with the implement 114 to control the implement controls 136, such as the lift cylinders 120, and the implement solenoids to change the position of the implement 114. Similarly, if the wirelessly received input operation command indicates changing the transmission gear of the machine 100, then the execution module 226 may coordinate with the datalink connection module 220 to send the control signal over the digital communication channel 144 to the respective on-board control module, in this case, the transmission ECM 156, which in turn controls the transmission controls 134 for changing the transmission gear in accordance with the received input operation command.

Therefore, if the machine 100 includes any on-board control modules, then the interface control module 202 can simply connect with those on-board control modules and control the machine components via the on-board control modules. Whereas, in case the machine does not include any on-board control module, then the interface control module 202 will control the machine components via direct I/O control links. Similarly, in case of a combination of different types of components, such as that in case of the machine 100, the interface control module 202 will use a combination of both the datalink controls as well as direct I/O based controls, as explained in the embodiment above. Therefore, if the interface control module 202 detects presence of an engine ECM, then the engine throttle control signals are send to the engine throttle via the engine ECM whereas if there is no engine ECM detected, then the interface control module 202 will send control signals over the direct I/O control link to the engine throttle.

Further, the interface control module 202 can adapt to any type of machine configuration and control all types of machine components, thereby making the retrofit remote control system 200 generic and suitable for all types of machines, whether including electrohydraulic controls or not. For example, in case of a wheel loader, the interface control module 202 will be able to control the bucket implement controls, while in case of a truck, the interface control module 202 will be able to control the hoist controls. Additionally, the interface control module 202 may also be able to limit a maximum permissible speed of the machine 100 based on detection of required hardware connected to the machine ECM 154.

In a further embodiment of the present disclosure, as shown in FIG. 5, a machine automation system (MAS) 400 may also be connected to the interface control module 202 to form a part of the entire retrofit remote control system 200. The MAS 400 may be configured to facilitate operation of the machine 100 in tele remote mode, semi-autonomous or fully autonomous mode from either the off-board remote control 204 or a remote operator station (not shown).

As shown in FIG. 5, the MAS 400 includes an Autonomy ECM (AECM) 402 that connects to the interface control module 202 by means of one or more digital communication channels. In one example, the AECM 402 may be configured to be connected to the interface control module 202 and the components of the machine 100 over an Ethernet Local area Network (LAN) 403 via switches and routers. Alternatively, the AECM 402 may connect to the digital communication channel 144 via the Ethernet LAN 403 disposed on the machine 100 and connect with the interface control module 202 through that. In a yet another implementation, a combination of Ethernet and the digital communication channel 144 on board the machine 100 may be implemented for connecting the AECM 402 to the interface control module 202 and the machine 100 and its components.

The Ethernet LAN 403 may be disposed on the machine 100 and is configured to enable operative communication between the MAS 400 and its components, the interface control module 202, and the various components of the machine 100 (such as the on-board control modules 152, the on-board components 126 and the sensors 159, 167 and 173). The Ethernet LAN 403 may be implemented by a plurality of communication channels, routers, and switches. In one embodiment, the Ethernet LAN 403 may operate at 100 base-T.

In an exemplary implementation, the AECM 402 may include an I/O unit 404, memory unit 406, a transceiver 408 and a processor 410 communicating with one another over a local bus (not shown). The I/O unit 404 is configured to wirelessly receive input commands from and send output notifications to either the off-board remote control 204 or a remote operator console positioned at the remote operator station via the transceiver 408.

The processor 410 is configured to execute the instruction stored in the memory unit 406 to perform one or more operations of the AECM 402. The processor 410 may include one or more microprocessors, microcomputers, microcontrollers, programmable logic controller, DSPs (digital signal processors), central processing units, state machines, logic circuitry, or any other device or devices that process/manipulate information or signals based on operational or programming instructions. The processor 410 may be implemented using one or more controller technologies, such as Application Specific Integrated Circuit (ASIC), Reduced Instruction Set Computing (RISC) technology, Complex Instruction Set Computing (CISC) technology, etc.

The memory unit 406 may include a random access memory (RAM) and read only memory (ROM). The RAM may be implemented by Synchronous Dynamic Random Access Memory (SDRAM), Dynamic Random Access Memory (DRAM), and/or any other type of random access memory device. The ROM may be implemented by a hard drive, flash memory and/or any other desired type of memory device.

The transceiver 408 is configured to transmit and receive messages and data to/from the off-board remote control 204 over the wireless communication channel 206 or the remote operator station over a wireless communication network (not shown), such as internet. In various embodiments, the transceiver 408 is configured to transmit and receives data/messages in accordance with the various communication standards and protocols, such as, TCP/IP, UDP, and 2G, 3G, or 4G communication protocols.

The MAS 400 may include one or more components to facilitate various levels and functionalities of autonomous control of the machine 100. For example, the MAS may include an environment monitoring system 412, a vehicle health and utilization system (VHUS) 420, a positioning system 422 and so on.

The environment monitoring system 412, generally, determines and transmits data based on the environment in which the machine 100 operates. More specifically, as shown, the environment monitoring system 412 includes one or more internet protocol (IP) cameras 414. In an embodiment, the environment monitoring system 412 may further include one or more microphones 413. In another embodiment, the environment monitoring system 412 may also include one or more Laser Detection and Ranging Systems (LADARs) 416. Each of the one or more IP cameras 414, the microphones 413, and the one or more LADARs 416 are configured to collect video, audio and positioning data and transmit to, for example, the AECM 402, the off-board remote control 204 and/or the remote operator station.

The one or more IP cameras 414 are mounted on the machine 100 by means of appropriate wiring and allow the operator to monitor the machine 100 and its surrounding environment. The one or more IP cameras 414 are configured to provide one or more viewing perspectives from the machine 100 (e.g., a front-facing viewing perspective, a rear-facing viewing perspective, etc.). Accordingly, each of the one or more IP cameras 414 may be positioned, relative to the machine 100, to provide a specific viewing perspective. For example, a first and second of the plurality of IP cameras 414 are positioned to replicate the field of view an operator would see looking forward and rearward while sitting in the operator cab 122 of the machine 100. A third IP camera 414 may provide a view forward on the left hand side of the front of the frame 102 to assist with tramming around corners and loading and dumping. A fourth IP camera 414 may be positioned either on the right hand side at the front end 106 of the frame 102, the right hand side of the rear end 108 of the frame 102 or as a camera that engages when the machine 100 is moving backwards (in reverse).

The IP cameras 414 are configured to generate video data associated with viewing perspectives of the machine 100. In an embodiment, the IP cameras 414 provide video data via high definition video streams that may be transmitted to the output device 312 of the off-board remote control 204 or to an output device provided at the remote operator station. Further, the microphone 413 may be configured to capture audio data associated with the machine 100, and the work area adjacent to the machine 100. Such audio data may be captured by the microphones 413 and transmitted in a video stream from one or more of the IP cameras 414 to the output device 312 of the off-board remote control 204 or to an output device provided at the remote operator station via the one or more switches and routers included the Ethernet LAN 403. It may be contemplated by a person skilled in the art that the term "video data" may include both video as well as audio data.

The one or more LADARs 416 are sensing devices configured to determine positioning data associated with the machine 100. For example, LADAR 416 is a radar-like remote sensing technology that measures distance by illuminating a target with a laser and analysing the reflected light. The one or more LADARs 416 are configured to generate positioning data associated with the machine 100, which can be used in guiding/operating the machine 100 in, for example, an autonomous or semi-autonomous mode. In some examples, the one or more LADARs 416 may generate positioning data based on specific placements of the LADARs 416 on the machine 100. The determined positioning data is transmitted to the output device 312 of the off-board remote control 204 or to an output device provided at the remote operator station via the one or more switches and routers included the Ethernet LAN 403.

Further, the VHUS 420 is configured to provide detection of an impeding or abnormal condition in any of the machine's 100 components and an operator notification to either modify operation of the machine 100, schedule maintenance, or perform a safe shutdown of the machine 100. The VHUS 420 may also be configured to provide production and performance information and may record load time, travel loaded, dump time, and travel empty, along with delay times. Data from the VHUS may be transmitted to the AECM 402 and to the off-board remote control 204 or to the remote operator station. For example, the VHUS 420 may be configured to communicate with the on-board components 126 and/or the on-board control modules 152 of the machine 100 via the interface control module 202 to detect any abnormal condition in any of these components of the machine 100.

Furthermore, the positioning system 422 is configured to be retrofitted on the machine 100 and configured to obtain position data associated with the machine 100. In some implementations of the present disclosure, the positioning system 422 may be configured to communicate fleet management information such as position and other machine 100 related information to an off-board fleet management systems (not shown) that provide real-time machine 100 positioning/tracking, assignment and productivity management for a fleet.

It may be contemplated that the above mentioned components of the MAS 400 are merely exemplary, and that the MAS 400 may also include additional or fewer components as per the required level of autonomy desired to be implemented on the machine 100. Further, as explained above, the AECM 402 is configured to establish a communication with the interface control module 202 and the off-board remote control 204 (including the remote operator station) to receive remote operation command for autonomously operating the one or more on-board components 126 and/or the retrofitted MAS 400 components of the machine 100.

Figure 7:
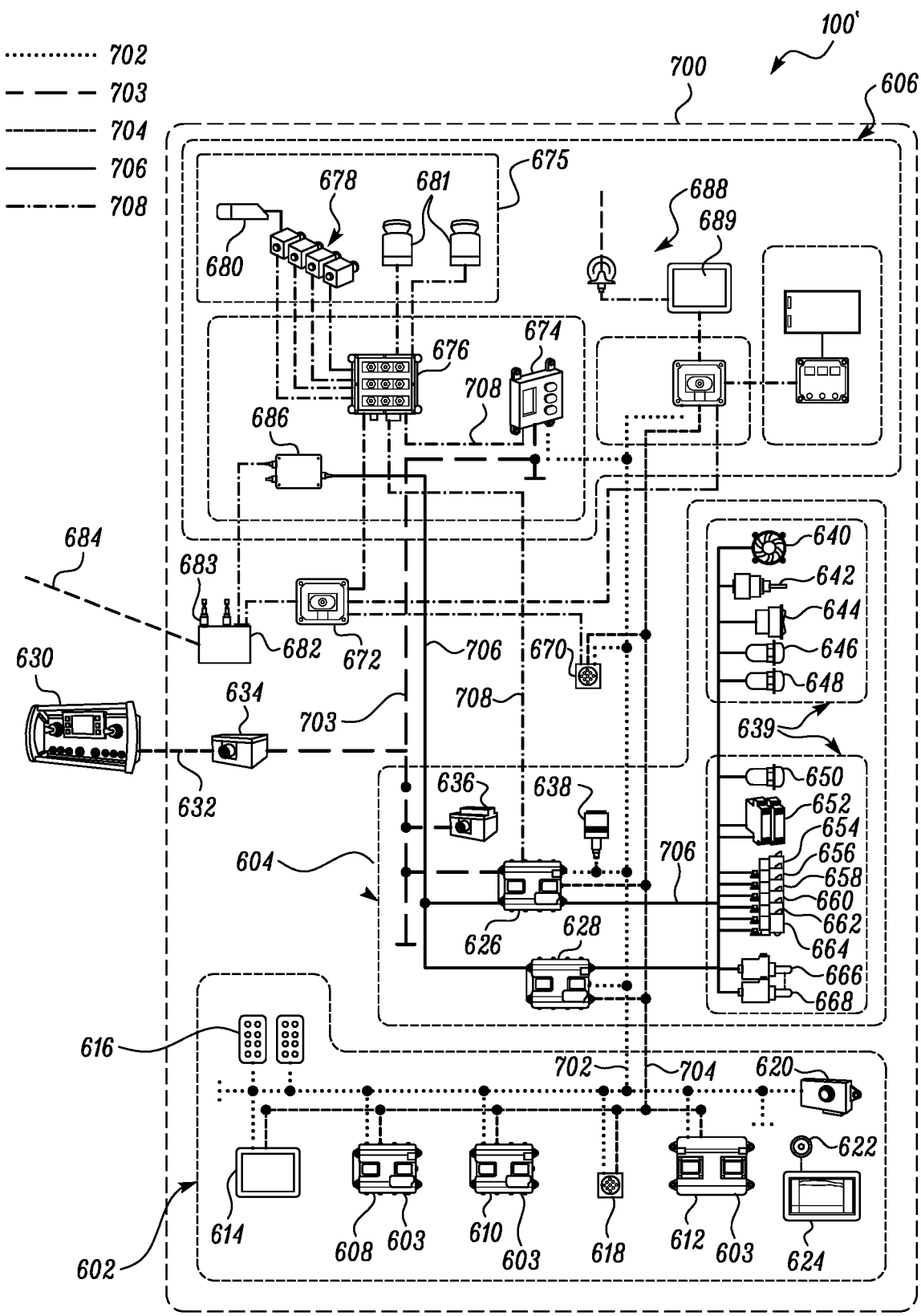
FIG. 7 illustrates a schematic of an exemplary control system of the machine having the retrofit remote control system and MAS, in accordance with the embodiments of the present disclosure.

FIG. 7 illustrates an exemplary control system 700 for a machine 100' contemplating an exemplary implementation of the retrofit remote control system of the present disclosure. The control system 700 includes a number of base machine components 602, retrofit remote control system components 604 and retrofit MAS components 606 implemented to facilitate operating the machine 100' in tele remote operation mode, semi-autonomous or fully autonomous mode from an off-board remote control 630 or a remote operator station (not shown). In the illustrated embodiment of the present disclosure, the control system 700 includes a plurality of communication links disposed on the machine 100' through which the components of the control system 700 communicate with one another. As shown, the control system 700 includes a first Controller Area Network (CAN) 702, a second CAN 703, a datalink (DL) 704, an Ethernet Local Area network (LAN) 708, and a plurality of direct I/O control links 706 for implementing the communication links within the control system 700.

In an embodiment of the present disclosure, the control system 700 includes a first interface control module 626 and a second interface control module 628 retrofitted on to the machine 100' to enable remote controlling of the machine 100' and its components remotely from the off-board remote control 630. In the illustrated embodiment, the off-board remote control 630 is a Line of Sight (LOS) operator console (hereinafter interchangeably referred to as the LOS operator console 630). The first interface control module 626 and the second interface control module 628 communicate with the off-board remote control 630 over a wireless communication channel 632 via a LOS transceiver 634. Examples of the wireless communication channel 632 may include, but not limited to a Frequency Hopping Spread Spectrum (FHSS) communication channel, radio broadcasting system, Wi-fi communication channel, and so on.

The on-board control modules 603 include a transmission ECM 608, a machine ECM 610, and an engine ECM 612. In an embodiment of the present disclosure, the interface control modules 626, 628 are configured to send control signals to the on-board control modules 603 (i.e., the transmission ECM 608, the machine ECM 610 and the engine ECM 612) via the first CAN 702 and the datalink 704 control, as will be explained in further detail in the following description.

The transmission ECM 608 is configured to generate (output) control signals, based on received (input) control signals, to control operation of a transmission controls of the machine 100' (such as transmission controls 134 of the transmission 112 as shown in FIGS. 1 and 2). For example, the transmission ECM 608 may control transmission speed, transmission mode (drive, reverse, parking brake, neutral), and related operations of the transmission of the machine 100'. The transmission input control signals are received by the interface control modules 626, 628 from the off-board remote control 630 via the (on-board) LOS transceiver 634, the second CAN 703, and are subsequently communicated to the transmission ECM 608 over the first CAN 702 and the datalink 704. The transmission ECM 608 is also configured to transmit data, including control feedback, to the interface control modules 626, 628 and subsequently to the off-board remote control 630 over the same communication channels as the input control signals. In some implementations, the transmission input control signals may also be received from the machine ECM 610. The control signals received from the machine ECM 610 are based on control signals received from an ECM of the remote operator station (not shown), transmitted from an off-board-transceiver to the local transceiver 682 (such as over a separate wireless communication channel 684), subsequently communicated to the AECM 674 via a local router 672, a first switch 676 and Ethernet LAN 708, further to the interface control modules 626, 628 and finally to the machine ECM 610 over the first CAN 702 and the DL 704. In yet another embodiment, output control signals generated by the off-board remote control 630 may be communicated to the interface control modules 626, 628 via the (on-board) LOS transceiver 634, and subsequently to the machine ECM 610 and finally to the transmission ECM 608 over the first CAN 702 and the DL 704.

Further, the machine ECM 610 is configured to generate output control signals, based on received input control signals, to control movement of the machine 100' and/or operation of the transmission ECM 608 (e.g., traction control, ride control, power management, braking, throttling), to control operation of an implement of the machine 100', to actuate one or more horns, indicators (e.g., parking brake indicator) or the like disposed on the machine 100'. The input control signals for the machine ECM 610 may be received by the interface control modules 626, 628 from the off-board remote control 630 (via the (on-board) LOS transceiver 634 and the second CAN 703), and are subsequently sent to the machine ECM 610 over the first CAN 702 and the DL 704. In some implementations, the input control signals may also be received from the AECM 674. The control signals received from the AECM 674 are based on control signals received from the ECM of the remote operator station, that are transmitted from an off-board-transceiver to the local transceiver 682, to the AECM 674 via the local router 672, the first switch 676 and the Ethernet LAN 708, and subsequently to the interface control modules 626, 628 and finally to the machine ECM 610 over the first CAN 702 and the DL 704. The machine ECM 610 is also configured to transmit data, including control feedback, to the interface control modules 626, 628 and subsequently to the off-board remote control 630 over the same communication channels as the input control signals.

The engine ECM 612 is configured to generate output control signals, based on received input control signals, to control operation of the engine of the machine 100' (such as the engine controls 130 associated with the engine 110 shown in FIGS. 1 and 2). For example, the engine ECM 612 may be configured to control engine speed, acceleration, and so on. The engine ECM 612 may also be configured to control the components and operation of an engine cooling system of the machine 100' (such as controlling the engine cooling system controls 140 shown in FIG. 2). The engine input control signals may be received by the interface control modules 626, 628 from the off-board remote control 630 via the (on-board) LOS transceiver 634 and the second CAN 703, and are subsequently sent to the engine ECM 612 over the first CAN 702 and the DL 704. In some implementations, the engine input control signals may also be received from the machine ECM 610. The control signals received from the machine ECM 610 are based on control signals received from an ECM of the remote operator station (not shown), transmitted from an off-board-transceiver to the local transceiver 682, that are subsequently communicated to the AECM 674 via the local router 672, a first switch 676 and Ethernet LAN 708, and further to the interface control modules 626, 628 and finally to the machine ECM 610 over the first CAN 702 and the DL 704. In yet another embodiments, output control signals generated by the off-board remote control 630 may be communicated to the transmission ECM 608 via the (on-board) LOS transceiver 634, the interface control modules 626, 628 and the machine ECM 610 over the first CAN 702 and the DL 704. The engine ECM 612 is also configured to transmit data, including control feedback, to the interface control modules 626, 628 and subsequently to the off-board remote control 630 over the same communication channels as the input control signals.

In an embodiment of the present disclosure, the control system 700 further includes one or more I/O control components 639 disposed on the machine 100' and operatively connected to the interface control modules 626, 628 via direct I/O link 706. For example, the I/O control components 639 may include, but not limited to, an enclosure cooling fan 640, enclosure temperature sensor 642, ACE switch 644, strobe lights (including red 646, amber 648 and green 650), expander relays 652, engine start-stop controls 654, power relays 656, work light assembly 658, fire suppression system 660, horn assembly controls 662, attachment relays 664, and implement and steer controls 666 and 668, respectively. In an exemplary implementation, the engine start-stop controls 654 may be configured to receive control signals from the interface control modules 626, 628 and send I/O based control signals to the engine ECM 612 via the I/O link 706. Furthermore, the relays 652, 656, 664 may be configured to convert low current signals received from the interface control modules 626, 628 into high current I/O based control signals to the ad-hoc components, such as the horn assembly controls 662, the strobe lights 646, 648, 650, and so on via the direct I/O link 706.

For the I/O control components 639, the input commands from the off-board remote control 630 are first received by the interface control modules 626, 628 via the LOS transceiver 634, and the second CAN 703, and then subsequently sent to the individual I/O control components 639 via their respective direct I/O control links 706.

In an embodiment of the present disclosure, the first CAN 702 is disposed on the machine 100' and is configured to operatively connect the interface control modules 626, 628, the AECM 674, a positioning system 688, the transmission ECM 608, the machine ECM 610, the engine ECM 612, the cab service port 618, the display 614, the keyboards 616, a tire monitoring system (TMS) transceiver (TMS) 620, and a rear view camera system (including rear view camera 622 and a rear view display 624). Similarly, the datalink (DL) 704 is also disposed on the machine 100' and is configured to operatively connect the interface control modules 626, 628, the positioning system 688, the transmission ECM 608, the machine ECM 610, the engine ECM 612, the display 614, the cab service port 618 and a service port 670. The service ports 618, 670 may be connection ports to connect add-on devices to the machine 100 and the interface control modules 626, 628 (such as, for servicing, configuration, updates to the interface control modules 626, 628, etc.). In some examples, the cab service port 618 may be an on-board component of the machine 100' whereas the service port 670 may be a part of the retrofit remote control system components 604.

The local transceiver 682 may be disposed on the remotely operated machine 100'. In one embodiment, the local transceiver 682 may be an Ethernet-compatible, wireless radio compatible transceiver. The local transceiver 682 may include one or more antennas 683. The local transceiver 682 is in operable communication with the off-board transceiver, the local router 672 (discussed herein below) and a remote shutdown module (RSM) 686. In one embodiment, the local transceiver 682 is in communication with the local router 672 and the RSM 686 via the Ethernet LAN 708.

The local transceiver 682 is configured to receive (wirelessly) control signals, safety signals and data from the off-board transceiver and is configured to transmit data from the MAS 606 to the off-board transceiver at the remote operator station. The received control signals may be generated by the ECM at the remote operator station (based on an operator input received from one or more I/O devices positioned at the remote operator station) and may control the operation of the machine 100' and its systems via the AECM 674 and the retrofit interface control modules 626, 628.

The data transmitted by the local transceiver 682 to the off-board transceiver may include video data (captured by one or more IP cameras 678), audio data (captured by a microphone 680) related to the operation of the machine 100' and the work area adjacent to the machine 100', positional and distance measurement information from one or more LADARs 681, machine 100' operational or health related data, and other information collected and transmitted to the off-board remote control 630. The off-board remote control 630 can additionally transmit the information to the remote operator station for monitoring/logging or display/replaying (e.g., video data and audio data).

In one embodiment, the local transceiver 682 is configured to support multiple Service Set Identifiers (SSID), thus allowing the local transceiver 682 to function on multiple subnetworks within the control system 700. In an embodiment, the local transceiver 682 may be configured to utilize Multi-in Multi-out (MIMO) 802.11N technology, which provides improved bandwidth and signal integrity when compared to a Single-In Single-Out 802.11G radio operating in diversity mode. In such an embodiment, the antennas 683 may be, for example, dual band MIMO (2.4/5 GHZ) antennas. The local transceiver 682 is also configured to support Profinet. As is known in the art, Profinet defines the communication with field connected peripheral devices. Its basis is a cascading real-time concept. Profinet may be used to define the data exchange between controllers and devices, as well as parameter setting and diagnosis.

Further, the local router 672 is retrofitted on the machine 100' and includes a local router processor. The local router 672 is in operable communication via the Ethernet LAN 708 with the local transceiver 682, the first switch 676, the RSM 686 and the service port 670. The local router 672 is also in operable communication with the AECM 674 and the environment monitoring system 675 via the first switch 676 and Ethernet LAN 708. The local router 672 is also in operable communication with the machine ECM 610, the cab service port 618, the transmission ECM 608, the engine ECM 612, the display 614, the keyboards 616 and the positioning system 688 via the interface control modules 626, 628, the service port 670, the first CAN 702, the datalink 704 and the Ethernet LAN 708.

The first switch 676 is disposed on the machine 100' and is in operable communication with at least the local router 672, the environment monitoring system 675 (i.e., the IP cameras 678, microphone 680 and LADARs 681), the AECM 674 and the interface control modules 626, 628 via the Ethernet LAN 708. The first switch 676 is configured to transmit and receive control signals/safety signals from the local router 672, and data from, at least, the environment monitoring system 675, the AECM 674 and the interface control modules 626, 628. The first switch 676 is configured to transmit data only to the one or more devices for which the message was intended. Furthermore, the first switch 676 has a Dynamic Host Configuration Protocol (DHCP) address assignment which allows devices, for example the IP cameras 678, the LADARs 681 and the microphone 680, to be fitted or replaced without manually configuring static IP addresses. DHCP is a standardized network protocol used for dynamically distributing network configuration parameters, such as IP addresses, reducing the need for a user to configure such parameters manually. The service port 670 is retrofitted on the machine 100' and is in operable communication with the transmission ECM 608, the machine ECM 610, and the engine ECM 612 and the positioning system 688 via the interface control modules 626, 628, the first CAN 702 and the datalink 704.

The AECM 674 is configured to receive the control signals and data via the local router 672 and/or the first switch 676. The AECM 674 may also receive control signals from the cab service port 618. The control signals may be generated by the off-board remote control 630, and/or the remote operator station.

The AECM 674 is further configured to process the control signals and data, generate (output) control signals based on the processed control signals and data, and transmit such control signals to the environment monitoring system 675, the display 614 or one or more of the transmission ECM 608, the machine ECM 610, the engine ECM 612 via the interface control modules 626, 628, wherein the control signals control an operation of the machine 100' and its components. When such control signals are received by the on-board control modules 603, they implement the instructions/commands of the control signal by sending control commands to their respective machine components via the first CAN 702 and/or the datalink 704.

It may be contemplated by a person skilled in the art that while the on-board control modules 603 implement control signals from the AECM 674 and/or the interface control modules 626, 628 that are based operator input to the off-board remote control 630 or the remote operator station, they also monitor and regulate certain functions of the machine 100'. Thus, advanced machine control features, such as traction control, ride control, power control and the like, will still operate as normal while the machine 100' is under tele remote, semi-autonomous or autonomous mode of operation. For example, the AECM 674 may transmit a control signal that instructs the machine ECM 610 to apply braking via the interface control modules 626, 628. While the machine ECM 610, in response to the control signal, may actuate the brakes, the machine ECM 610 may still continue to implement power management (an advanced machine control feature).

Further, the AECM 674 may receive data from one or more on-board control modules 603, the interface control modules 626, 628, the positioning system 688, the local router 672 and the first switch 676 of the Ethernet LAN 708. The AECM 674 is also configured to receive data captured by various sensors disposed on the machine 100' (e.g., the articulation sensor 638, the inertial measurement unit (IMU) sensor 636, and the like). For example, the AECM 674 receives data from the IMU 636 (in one embodiment, via the second CAN 703) and uses such data to determine acceleration and machine inclination angle. In an embodiment, the IMU sensor 636 may be disposed on the rear end of the machine 100' (such as the rear end 108 shown in FIG. 1). The AECM 674 receives data from the engine and transmission speed sensors to determine engine revolutions per minute (RPM) and machine ground speed. The AECM 674 is configured to determine machine direction, implement position and machine mode. In tele remote, semi-autonomous or autonomous modes, when the remote operator is controlling the machine, the maximum available gear may be restricted. For example, the machine 100' may be limited to operation in first gear. The AECM 674 is also configured to control certain (machine 100') functions, such as ground condition monitoring, automatic steering/turning (when activated by the operator) etc. The AECM 674 is also configured to forward certain operator requests for advanced control features from the off-board remote control 630 or the remote operator station to the appropriate the on-board control modules 603, such as performing automatic dig position). When automatic dig position is requested/enabled, the depth and loading of the implement, such as the bucket 116 in a material is automatically controlled by the machine 100' in response to a productivity value. The AECM 674 may also be configured to provide data to payload type systems that analyze load times, number of passes and payload data to determine efficiency optimization. Similarly, the AECM 674 may be configured to support tire monitoring, as well.

The AECM 674 is also configured to transmit data via the local transceiver 682, including feedback information, to the remote operator station. In addition, the AECM 674 is configured to transfer control of the machine 100' to the off-board remote control 630 (i.e., the LOS operator console 630) for machine recovery purposes, when the machine ECM 610 detects that signals are being received from both the AECM 674 and the LOS operator console 630, as discussed later herein.

Although the above description includes a number of exemplary components of the control system 700, it will be contemplated by a person skilled in the art that the machine 100' and the control system 700 may include additional components that are omitted from the description for the sake of brevity of the present disclosure.

INDUSTRIAL APPLICABILITY

The retrofit remote control system 200 facilitates enabling remote control functionalities in a machine which is inherently incapable of being remote controlled. For example, any type of machine can be converted to a remote controlled machine and even extended to a fully autonomous machine by simply retrofitting the retrofit remote control system 200 and the MAS 400 on to the machine. Accordingly, a user can convert any of their old models of machines to being remote controlled, instead of buying a new machine.

The interface control module 202 is capable of adapting to any configuration of the machine 100 irrespective of whether the machine 100 includes electrohydraulic controls or not. Therefore, if a machine 100 includes any on-board control modules, then the interface control module 202 can simply connect with those on-board control modules and control the machine components via the on-board control modules. Whereas, in case the machine does not include any on-board control module, then the interface control module 202 will control the machine components via direct I/O control links. Similarly, in case of a combination of different types of components, the interface control module 202 will use a combination of both the datalink controls as well as direct I/O based controls, as explained in the embodiments above. Therefore, if the interface control module 202 detects presence of an transmission ECM, then the transmission control signals are send to the transmission gear solenoids via the transmission ECM whereas if there is no transmission ECM detected, then the interface control module 202 will send control signals over the direct I/O control link to the transmission gear solenoids.

Further, the interface control module 202 can adapt to any type of machine configuration and control all types of machine components, thereby making the retrofit remote control system 200 generic and suitable for all types of machines. For example, in case of a wheel loader, the interface control module 202 will be able to control the bucket implement controls, while in case of a truck, the interface control module 202 will be able to control the hoist controls.

Figure 8:
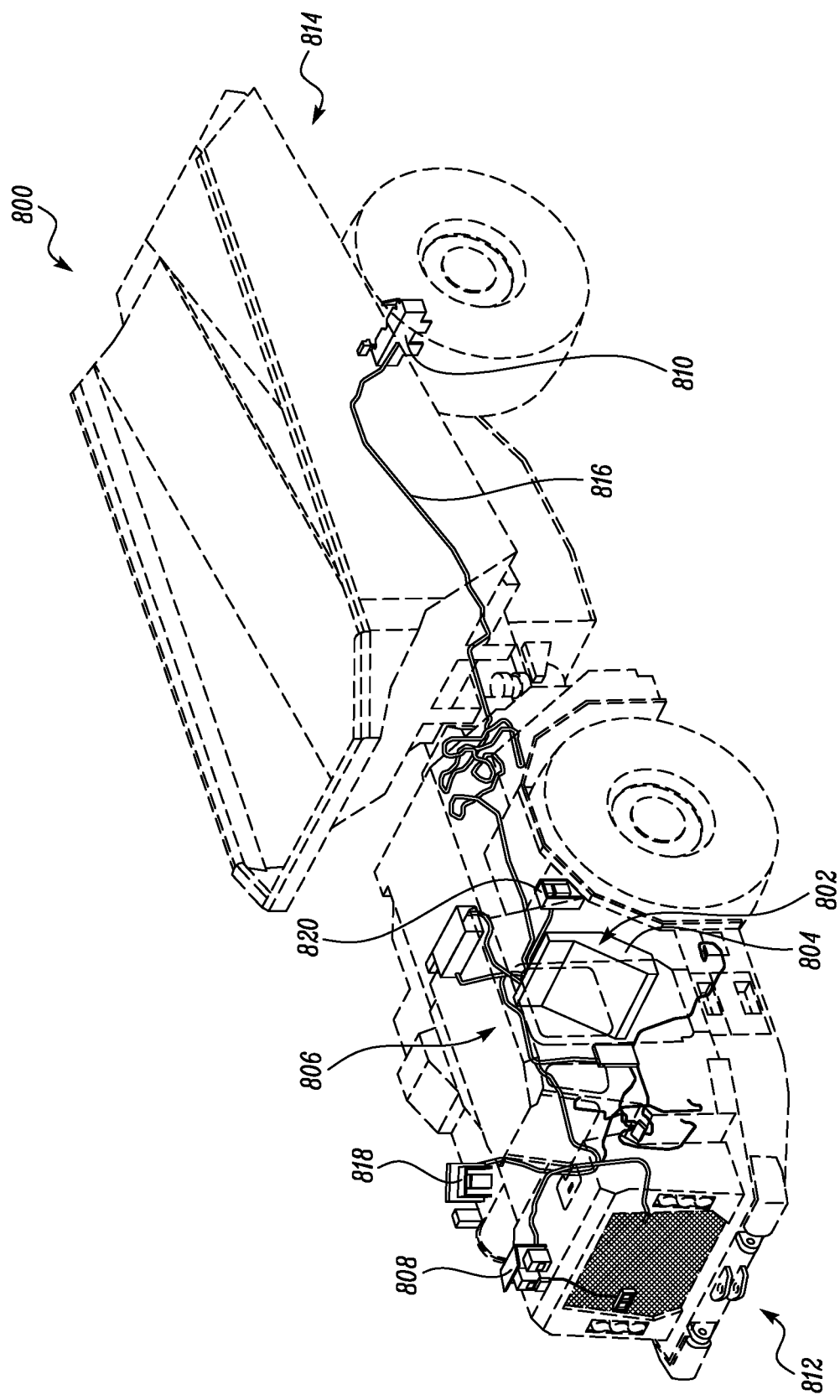
FIG. 8 illustrates an exemplary interface control module retrofitted onto an underground articulated truck, in accordance with an embodiment of the present disclosure.

For example, FIG. 8 illustrates an exemplary interface control module 802 retrofitted onto another type of machine, such as an underground articulated truck (UAT) 800. As shown, the interface control module 802 may be housed within a housing 804. The housing 804 may be positioned within an operator cabin 806 of the UAT 800, behind an operator seat. As described previously, the interface control module 802 may connect to one or more on-board control modules, such as machine ECM, transmission ECM, implement ECM, etc., (not shown) via on-board CAN and datalink of the UAT 800. The interface control module 802 may also be connected to the in-cab machine controls, such as brakes, accelerator, etc., and implement controls via direct I/O controls or on-board CAN or datalink connections (not shown). Further, ad-hoc components may be retrofitted onto the UAT 800 by connecting them to the interface control module 802 via direct I/O controls, such as harness 816. For example, as illustrated, LADARs 808, 810 may be retrofitted onto a front end 812 and a rear end 814, respectively, of the UAT 800 and connected to the interface control module 802 via the harness 816. One or more cameras 818, 820 may also be retrofitted onto the UAT 800 and connected to the interface control module 802 via the harness 816. The LADARs 808, 810 along with the cameras 818, 820 may be retrofitted to facilitate environment monitoring while operating the UAT 800 remotely. Further, other ad-hoc components, such as strobe light assembly, fire suppression system, positioning system, may also be retrofitted onto the UAT 800 and connected to the interface control module 802 via the harness 816, in a similar manner.

The interface control module 202 further acts as an interface between the base machine components and MAS 400. Thus, the MAS 400 can also be retrofitted on to the machine 100 and MAS 400 will control the machine components by sending control signals to the machine components via the interface control module 202, which in turn sends the control signal to the respective machine component over either the datalink connection or the I/O control link, as applicable. Additionally, the interface control module 202 facilitates addition of many ad-hoc components that too can be retrofitted on the machine 100 to provide enhanced functionalities that were originally not there on the machine 100.

Figure 9:
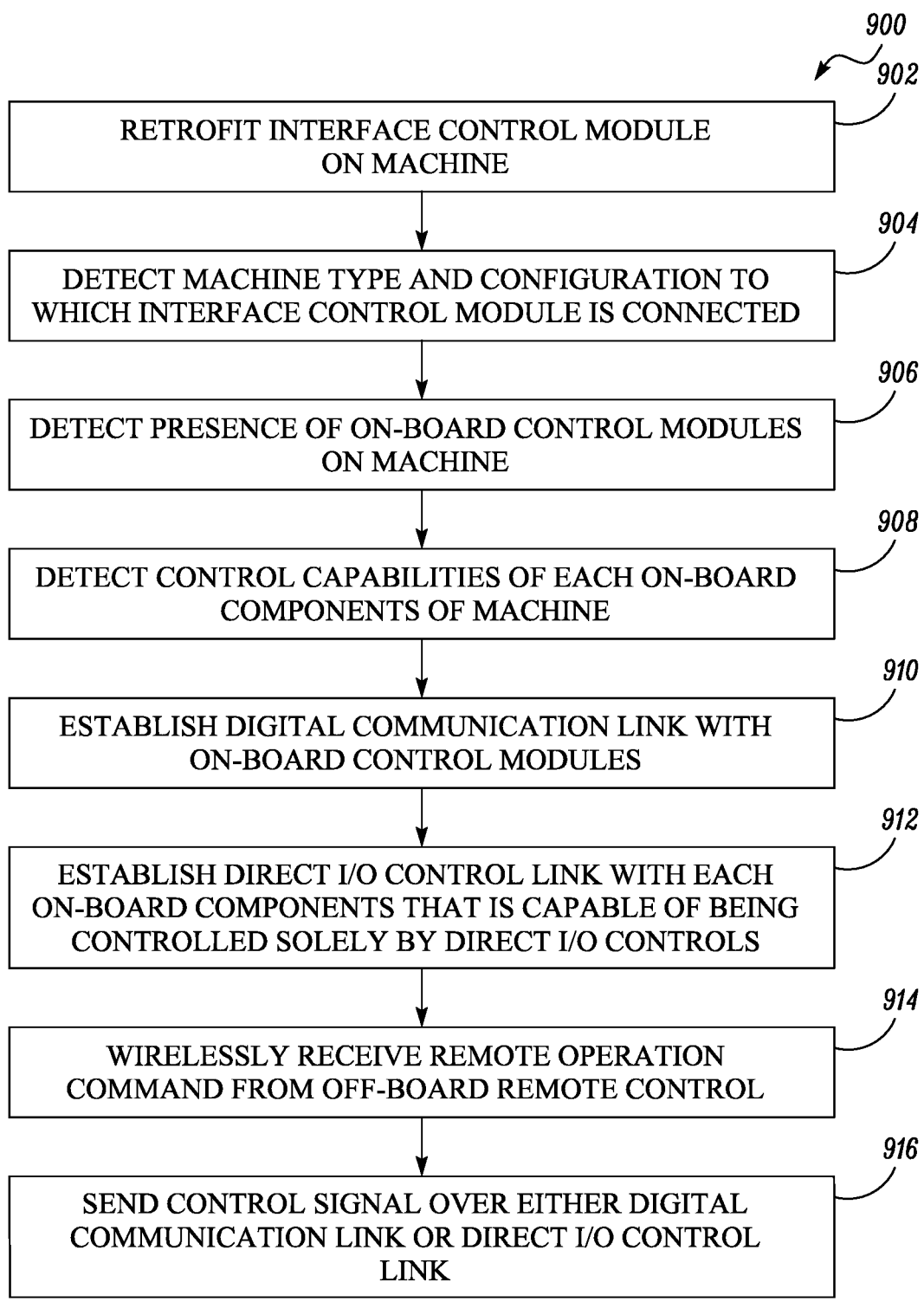
FIG. 9 illustrates an exemplary flowchart for a method of enabling remote controlling of a machine that is inherently incapable of being remote controlled, in accordance with the embodiments of the present disclosure.

FIG. 9 illustrates an exemplary method 900 for enabling remote controlling of one or more on-board components 126 of the machine 100 that are inherently incapable of being remote controlled.

Initially, at step 902, the interface control module 202 is retrofitted on to the machine 100. In an exemplary embodiment, the interface control module 202 is capable of wireless communication with the off-board remote control 204 over a wireless communication channel 206.

At step 904, a machine type and machine configuration, to which the retrofit remote control system 200 is connected, is detected, such as by the machine detection module 216. In an exemplary implementation, the machine detection module 216 may receive an input from the off-board remote control 204 indicating a predefined machine type to which the retrofit remote control system 200 is connected. Alternatively, the machine detection module 216 may provide a list of machine types to the I/O unit 304 of the off-board remote control 204 and receive a user selection of the machine type from the off-board remote control 204. In addition to the machine type, the machine detection module 216 may also receive a machine identification and/or any other information related to the machine type and machine configuration from the off-board remote control 204.

Based on the detected machine type, the configuration of the machine 100 and its on-board components 126 is detected, such as by the processing module 218. For example, the processing module 218 may be configured to communicate with a machine database 230 that includes the various configuration details of all the machine types. Alternatively, the machine configuration details may be received along with the machine identification from the operator via the off-board remote control 204. The machine database 230 may store the details about every machine, including the machine type, machine model number, machine make year, machine manufacturer, machine configuration details and so on. Further, the machine configuration details may include the details about the various on-board components of every type of machine, their respective control links, the one or more on-board control modules associated with each type of machine, and so on.

Further, at step 906, presence of any on-board control modules on the machine 100 is detected, such as by the processing module 218. In an example, the processing module 218 may be configured to extract the details of the on-board control modules 152 from the machine configuration received from the machine database 230. Alternatively, the operator of the machine 100 may manually feed the details of the on-board control modules 152 present on the machine 100.

At step 908, the control capabilities of each of the on-board components 126 of the machine 100 is detected, such as by the processing module 218. In an embodiment of the present disclosure, the processing module 218 is configured to identify that the on-board components (such as components 145) that are controlled by the on-board control modules (such as by on-board control modules 152) are capable of datalink control, whereas all the other on-board components (such as components 147) that are not controlled by any on-board control modules are capable of only direct I/O controls.

Further, at step 910, a digital communication link is established with the on-board control modules 152 for controlling the datalink control components 145 of the machine 100. For example, the interface control module 202 is configured to establish a communication link with the on-board control modules 152 over the digital communication channel 144 disposed on the machine 100.

At step 912, a direct I/O control link 146 is established with each of the on-board components 126 that are capable of being controlled solely by direct I/O controls (such as the components 147). The direct I/O control link 146 between the interface control module 202 and each of the individual components on the machine 100, may be supplemented with appropriate wiring and harnessing disposed on the machine 100 to connect the individual component with the interface control module 202.

Furthermore, at step 914, a remote operation command is wirelessly received from the off-board remote control 204 over the wireless communication channel 206. Subsequently, at step 916, control signal is sent over either the digital communication channel 144 or the direct I/O control link 146, 236. For example, the processing module 218 may identify the relevant component of the machine 100 to which the input operation command is associated with and accordingly sends the control signal over either the digital communication channel 144 or the direct I/O control link 146 or 236.

In an alternative embodiment, the method 900 may further include retrofitting the machine automation system MAS (400) to the machine 100, such that the MAS 400 communicates and controls the machine components via the interface control module 202, in the manner described above in reference to FIGS. 5 and 7.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A retrofittable remote control system for enabling remote controlling of an on-board component of a machine that was previously incapable of being remote controlled, the remote control system comprising:
    an interface control module configured to be retrofitted to the machine; and
    an off-board remote control configured to communicate with the interface control module over a wireless communication channel,
    wherein the interface control module is configured to:
        detect presence of an on-board control module associated with the on-board component of the machine, the on-board control module being configured to communicate with the on-board component over a digital communication channel disposed on the machine;
        establish a digital communication link with the on-board control module over the digital communication channel when the on-board control module is detected to be present on the machine;
        establish a direct Input/Output (I/O) communication link with the on-board component of the machine when the on-board control module is detected to be absent from the machine;
        wirelessly receive a remote operation command from the off-board remote control to control the on-board component of the machine; and
        send, based on the detection, a control signal over one of the direct I/O communication link or the digital communication channel via the detected on-board control module, for controlling the on-board component of the machine, the control signal being corresponding to the wirelessly received remote operation command; and
    a machine automation system (MAS) having an Autonomous electronic control module (AECM) and Ethernet Local Area Network (LAN) communication channels in communication with the interface control module, off-board control module, at least one machine sensor, at least one transmission sensor, and at least one engine sensor, and wherein the AECM is configured to:
        operatively communicate with the interface control module over an Ethernet communication channel;
        wirelessly communicate with the off-board remote control to receive remote operation command from the off-board remote control for facilitating an autonomous mode of operation of the on-board component;
        send control signals to the interface control module over one of the Ethernet LAN communication channel for controlling the on-board component of the machine via one of the digital communication link or the direct I/O communication link.

2. The retrofittable remote control system as claimed in claim 1, wherein the on-board component includes one or more of machine controls, steering controls, brakes controls, implement controls, engine controls, transmission controls, hydraulic controls, work light controls, in cab controls, in-cab displays, tire monitoring system controls, engine cooling system controls, battery controls, horn assembly controls, cab-door actuation mechanism controls, indicator system controls, exhaust after treatment system controls, and Heating, Ventilation and Air Conditioning (HVAC) system controls associated with the machine.

3. The retrofittable remote control system as claimed in claim 1, wherein the on-board control module includes one or more of a machine electronic control module, transmission electronic control module, implement control electronic control module, engine electronic control module, exhaust after treatment electronic control module, battery control module, and Heating, Ventilation and Air Conditioning (HVAC) electronic control module associated with the machine.

4. The retrofittable remote control system as claimed in claim 1, wherein the digital communication channel includes one or more of a controller area network (CAN), datalink (DL) communication channel, and Ethernet Local Area network (LAN).

5. The retrofittable remote control system as claimed in claim 1 further comprising a first set of one or more ad-hoc components, configured to be retrofitted on to the machine to support functioning of the interface control module, each of the one or more ad-hoc components within the first set being configured to communicate with the interface control module over a respective direct I/O communication link, and wherein the first set of one or more ad-hoc components include one or more of a machine strobe light assembly, an enclosure cooling assembly, a safety expander relay assembly, an automation control enable switch, and an enclosure temperature sensor.

6. The retrofittable remote control system as claimed in claim 1 further comprising a second set of one or more ad-hoc components, configured to be retrofitted on to the machine to provide additional functionalities on the machine, each of the one or more ad-hoc components within the second set being configured to communicate with the interface control module over a respective direct I/O communication link, and wherein the second set of one or more ad-hoc components include one or more of environment monitoring assembly, fire suppression system, and a positioning system.

7. The retrofittable remote control system as claimed in claim 1, wherein the off-board remote control is one of a line of sight remote control, remote operating console, or a handheld mobile device having a graphical user interface (GUI) application installed thereon for remotely operating the machine.

8. A method for enabling remote controlling of an on-board component of a machine that was previously incapable of being remote controlled, the method comprising:
    retrofitting an interface control module on to the machine, the interface control module being configured to communicate with an off-board remote control over a wireless communication channel;
    detecting, by the retrofitted interface control module, presence of an on-board control module associated with the on-board component of the machine, the on-board control module being configured to communicate with the on-board component over a digital communication channel;
    establishing, by the interface control module, a digital communication link with the on-board control module over the digital communication channel when the on-board control module is detected to be present on the machine;
    establishing, by the interface control module, a direct Input/Output (I/O) communication link with the on-board component when the on-board control module is detected to be absent from the machine;
    wirelessly receiving, by the interface control module, a remote operation command from the off-board remote control over the wireless communication channel to control the on-board component of the machine;

sending, by the interface control module, based on the detection, a control signal over one of the direct I/O communication link or the digital communication link via the detected on-board control module, for controlling the on-board component, the control signal being corresponding to the wirelessly received remote operation command; and retrofitting a machine automation system (MAS) having an Autonomous electronic control module (AECM) and Ethernet Local Area Network (LAN) communication channel on to the machine to enable autonomous operations of the machine, the MAS being in communication with the off-board remote control over the wireless communication channel;

communicating, by the AECM, with the interface control module over an Ethernet LAN communication channel;

wirelessly receiving, by the AECM, a remote operation command for autonomously operating the on-board component of the machine;

sending, by the AECM, control signals to the interface control module over the Ethernet LAN communication channel for controlling the on-board component of the machine via one of the digital communication link through the on-board control module or the direct I/O communication link.

9. The method as claimed in claim 8, wherein the off-board remote control is one of a line of sight remote control, remote operating console, or a handheld mobile device having a graphical user interface (GUI) application installed thereon for remotely operating the machine.

10. The method as claimed in claim 8, wherein the on-board component includes one or more of machine controls, steering controls, brakes controls, implement controls, engine controls, transmission controls, hydraulic controls, work light controls, in cab controls, in-cab displays, tire monitoring system controls, engine cooling system controls, battery controls, horn assembly controls, cab-door actuation mechanism controls, indicator system controls, exhaust after treatment system controls, and Heating, Ventilation and Air Conditioning (HVAC) system associated with the machine.

11. The method as claimed in claim 8, wherein the on-board control module includes one or more of a machine electronic control module, transmission electronic control module, implement control electronic control module, engine electronic control module, a battery control module, exhaust after treatment electronic control module, and Heating, Ventilation and Air Conditioning (HVAC) electronic control module associated with the machine.

12. The method as claimed in claim 8, wherein the digital communication channel includes one or more of a controller area network (CAN), datalink (DL) communication channel, and Ethernet Local Area network (LAN).

13. The method as claimed in claim 8 further comprising retrofitting a first set of one or more ad-hoc components, on to the machine to support functioning of the interface control module, each of the one or more ad-hoc components within the first set being configured to communicate with the interface control module over a respective I/O communication link, and wherein the first set of one or more ad-hoc components include one or more of a machine strobe light assembly, an enclosure cooling assembly, a safety expander relay assembly, an automation control enable switch, and an enclosure temperature sensor.

14. The method as claimed in claim 8 further comprising retrofitting a second set of one or more ad-hoc components, on to the machine to provide additional functionalities on the machine, each of the one or more ad-hoc components within the second set being configured to communicate with the interface control module over a respective I/O communication link, and wherein the second set of one or more ad-hoc components includes one or more of an environment monitoring assembly, fire suppression system, and a positioning system.

15. A machine comprising:
an on-board component previously incapable of being remotely controlled; and
a retrofit remote control system operatively connected to the on-board component and configured to enable remote controlling of the on-board component, the retrofit remote control system including:
an interface control module configured to communicate with an off-board remote control over a wireless communication channel, the interface control module being configured to:
detect presence of an on-board control module associated with the on-board component of the machine, the on-board control module being configured to communicate with the on-board component of the machine over a digital communication channel;
establish a digital communication link with the on-board control module over the digital communication channel when the on-board control module is detected to be present on the machine;
establish a direct Input/Output (I/O) communication link with the on-board component of the machine when the on-board control module is detected to be absent from the machine;
wirelessly receive a remote operation command from the off-board remote control over the wireless communication channel to control the on-board component;
send, based on the detection, a control signal over one of the direct I/O communication link or the digital communication channel via the detected on-board control module, for controlling the on-board component of the machine, the control signal being corresponding to the wirelessly received remote operation command; and
a machine automation system (MAS) having an Autonomous electronic control module (AECM) and Ethernet Local Area Network (LAN) communication channels in communication with the interface control module, off-board control module, at least one machine sensor, at least one transmission sensor, and at least one engine sensor, and wherein the AECM is configured to:
operatively communicate with the interface control module over an Ethernet communication channel;
wirelessly communicate with the off-board remote control to receive remote operation command from the off-board remote control for facilitating an autonomous mode of operation of the on-board component;
send control signals to the interface control module over one of the Ethernet LAN communication channel for controlling the on-board component of the machine via one of the digital communication link or the direct I/O communication link.

16. The machine as claimed in claim 15, wherein:
the on-board component includes one or more of machine controls, steering controls, brakes controls, implement controls, engine controls, transmission controls, hydraulic controls, work light controls, in cab controls, in-cab displays, tire monitoring system controls, engine cooling system controls, battery controls, horn assembly controls, cab-door actuation mechanism controls, indicator system controls, exhaust after treatment system controls, and Heating, Ventilation and Air Conditioning (HVAC) system; and the on-board control module includes one or more of a machine electronic control module, transmission electronic control module, implement control electronic control module, engine electronic control module, a battery control module, exhaust after treatment electronic control module, and Heating, Ventilation and Air Conditioning (HVAC) electronic control module.

17. The machine as claimed in claim 15 further comprising:

a first set of one or more ad-hoc components, configured to be retrofitted on to the machine to support functioning of the interface control module, each of the one or more ad-hoc components within the first set is configured to communicate with the interface control module over a respective direct I/O communication link, wherein the first set of one or more ad-hoc components include one or more of a machine strobe light assembly, an enclosure cooling assembly, a safety expander relay assembly, an automation control enable switch, and an enclosure temperature sensor; and a second set of one or more ad-hoc components, configured to be retrofitted on to the machine to provide additional functionalities on the machine, each of the one or more ad-hoc components within the second set being configured to communicate with the interface control module over a respective direct I/O communication link, wherein the second set of one or more ad-hoc components include one or more of an environment monitoring assembly, fire suppression system, and a positioning system.

* * * * *